(12) United States Patent
Ito et al.

(10) Patent No.: US 7,264,386 B2
(45) Date of Patent: Sep. 4, 2007

(54) METHOD AND APPARATUS FOR ADJUSTING VISIBILITY OF VEHICLE

(75) Inventors: Mitsuhito Ito, Fujisawa (JP); Kenya Uenuma, Yokohama (JP); Keijiro Iwao, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 181 days.

(21) Appl. No.: 11/033,388

(22) Filed: Jan. 12, 2005

(65) Prior Publication Data

US 2005/0162856 A1 Jul. 28, 2005

(30) Foreign Application Priority Data

Jan. 28, 2004 (JP) .............................. P2004-020375

(51) Int. Cl.
*B60Q 1/26* (2006.01)

(52) U.S. Cl. ...................... 362/503; 362/464; 362/465; 362/461; 362/471; 362/540

(58) Field of Classification Search ................ 362/459, 362/460, 464–466, 471, 503, 507, 514, 37, 362/540

See application file for complete search history.

(56) References Cited

U.S. PATENT DOCUMENTS

| | | | | |
|---|---|---|---|---|
| 6,416,210 | B1 * | 7/2002 | Uchida | 362/539 |
| 6,607,295 | B2 * | 8/2003 | Hayakawa | 362/517 |
| 6,619,827 | B2 * | 9/2003 | Uchida | 362/539 |
| 2001/0019484 | A1 * | 9/2001 | Schauwecker et al. | 362/539 |
| 2002/0044453 | A1 * | 4/2002 | Naganawa et al. | 362/539 |
| 2003/0147247 | A1 * | 8/2003 | Koike | 362/464 |

FOREIGN PATENT DOCUMENTS

| | | |
|---|---|---|
| JP | 06-144108 | 5/1994 |
| JP | 2000-211355 A | 8/2000 |

* cited by examiner

*Primary Examiner*—Jong-Suk (James) Lee
*Assistant Examiner*—Jacob Y Choi
(74) *Attorney, Agent, or Firm*—McDermott Will & Emery LLP

(57) ABSTRACT

An illumination property of headlights 4 is controlled so that light quantity or color in a belt-like region B including a virtual line segment A may be different from those in other regions, and thereby the virtual line segment A which uniformly inclines downward from an apex T deviated from a driver toward opposite sides in a vehicle-width direction is indicated on a road surface. The virtual line segment A thus indicated can suppress inclinations of forward visibility and also suppress the sway of ahead inclination angle when a vehicle turns, thereby stabilizing a driving posture of a driver and suppressing steering disturbance.

17 Claims, 25 Drawing Sheets

BRIGHTNESS
(COLOR TEMPERATURE)

X     X1     X0

BRIGHTNESS
(COLOR TEMPERATURE)

X   X1   X0

METHOD AND APPARATUS FOR ADJUSTING VISIBILITY OF VEHICLE

BACKGROUND OF THE INVENTION

The present invention relates to a method and apparatus for adjusting visibility of vehicle by which driver's forward visibility is adjusted and, more particularly, to a technique for stabilizing a sense of balance of a driver and suppressing the sway of a head inclination angle.

As disclosed in Japanese Patent Application Laid-Open No. 2000-211355, there has been known a method for adjusting visibility of vehicle in which driver's forward visibility is adjusted in accordance with a vehicle's running state by shielding a lower end of a windshield, thereby enhancing the safety of driving.

In such a conventional method, an actual vehicle speed and a distance between vehicles are detected, and these values are compared with corresponding values of a calculation method, so that the visibility is limited especially when running on an expressway to prevent tiredness and sleepiness of a driver thereby securing the safety of driving, and sufficient visibility is provided during medium or low speed running to prevent the driver from overlooking an obstacle existing immediately in front of the vehicle.

That is, the excellent visibility immediately in front of the vehicle when running on an expressway makes a driver too nervous and thus increases his/her tiredness. In order to prevent this, the height of the lower end of the windshield is changed in accordance with situations, thereby limiting the visible area.

SUMMARY OF THE INVENTION

In the conventional method of adjusting visibility of vehicle, however, a parting line of an upper end edge which shields the lower end of the windshield extends straightly in a vehicle-width direction. Therefore, when making a right turn on a curve, if coordinates are set on vertical and horizontal axes relative to the gravity of earth as shown in FIG. 1A, the vehicle rolls to the left, and the driver's head inclines to the right against a turning lateral acceleration. At this time, if the driver sees the scenery relative to the head coordinates, the forward visibility rolls at an angle equal to or greater than a roll angle of the vehicle as shown in FIG. 1B. The driver then adjusts the head inclination angle so that a vector sum of the gravitational acceleration and the turning lateral acceleration is oriented in a direction near a head vertical axis. However, it is found that this position is not always maintained stably and is varied. This variation makes the driver's driving posture unstable which consequently disturbs steering operations, thereby causing a vicious circle that this steering disturbance varies the turning lateral acceleration and the head inclination angle becomes further unstable.

As a result of elaborate studies on this problem, the inventors have found that one of causes of the sway of the head inclination angle is ascribable to a direction of a window frame lower end line of the vehicle. That is, it is known that one loses a sense of balance when he/she loses the horizontal degree of a reference line. The inventors have applied this to a vehicle and studied on this. As a result, the sway of the window frame lower end line at the time of rolling is found to visually disturb the sense of balance and affect the head inclination angle.

It is, therefore, an object of the present invention to provide a method and apparatus for adjusting visibility of vehicle that can stabilize a sense of balance of a driver and suppress the sway of a head inclination angle.

In order to accomplish this object, the present invention provides the method of adjusting visibility for vehicle by which forward visibility of a driver is adjusted, and the method comprises the processes of: disposing a virtual parting line at a lower end of a windshield, the parting line having an apex and left and right ridgelines, the apex being located between a position opposed to the driver and a vehicle center position and being deviated from the opposed position, the left and right ridgelines uniformly inclining downward from the apex toward opposite sides in a vehicle-width direction; and controlling an illumination property of headlights of the vehicle so that light quantity or color temperature in a belt-like region on a road surface is different from those in other illuminated regions, the belt-like region including at least a virtual line segment on the road surface that is composed of a set of points at which a line connecting a driver's viewpoint with a point on the parting line intersects with the road surface in front of the vehicle.

Furthermore, in order to accomplish the above object, the present invention provides the visibility adjusting apparatus for vehicle for adjusting forward visibility of a driver, and the apparatus comprises a control unit that disposes a virtual parting line at a lower end of a windshield and controls an illumination property of headlights of a vehicle so that light quantity or color temperature in a belt-like region on a road surface is different from those in other illuminated regions, wherein the parting line has an apex and left and right ridgelines, the apex being located between a position opposed to the driver and a vehicle center position and being deviated from the opposed position, the left and right ridgelines uniformly inclining downward from the apex toward opposite sides in a vehicle-width direction, and the belt-like region includes at least a virtual line segment on the road surface that is composed of a set of points at which a line connecting a driver's viewpoint with a point on the parting line intersects with the road surface in front of the vehicle.

DETAILED DESCRIPTION OF THE PREFERRED EMBODIMENTS

A method of adjusting visibility for vehicle according to an embodiment of the present invention will be described below in detail with reference to the accompanying drawings.

Figure 1A:
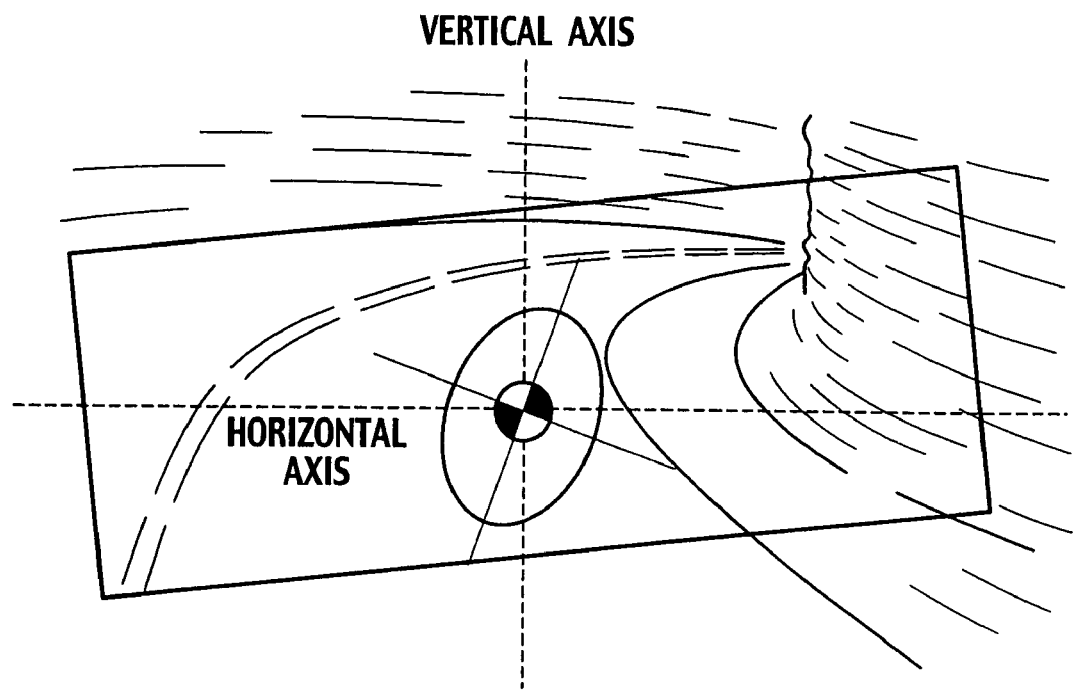
FIGS. 1A and 1B show explanatory views of a conventional method of adjusting visibility for vehicle.
Figure 1B:
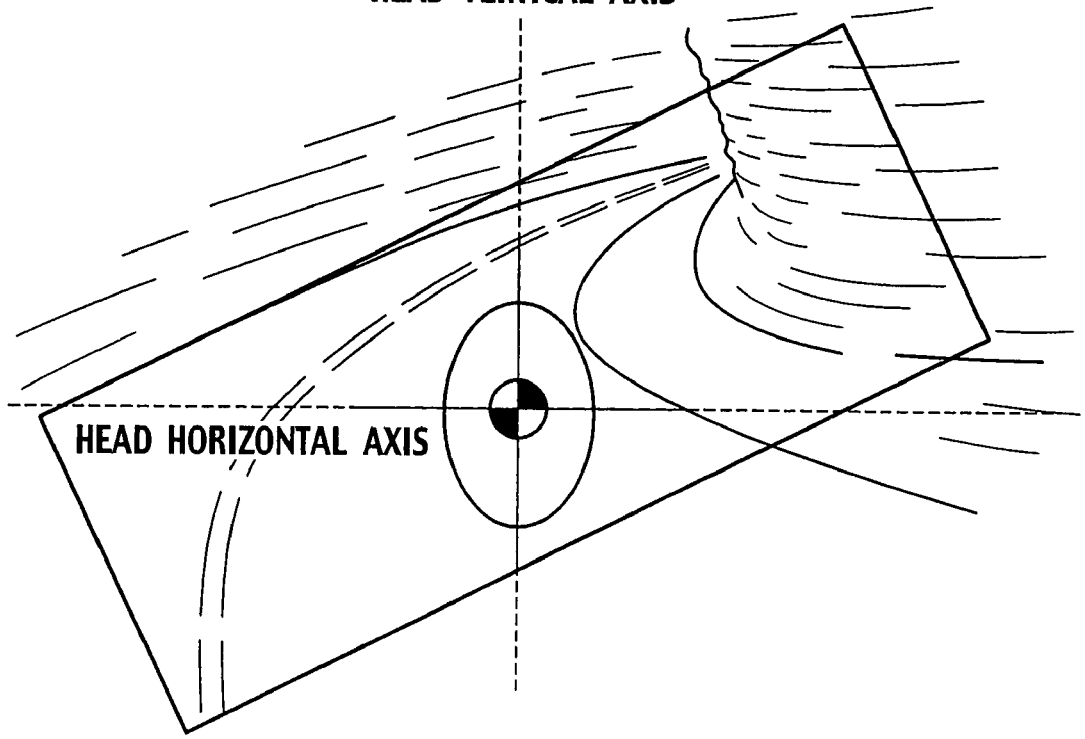
Figure 2:
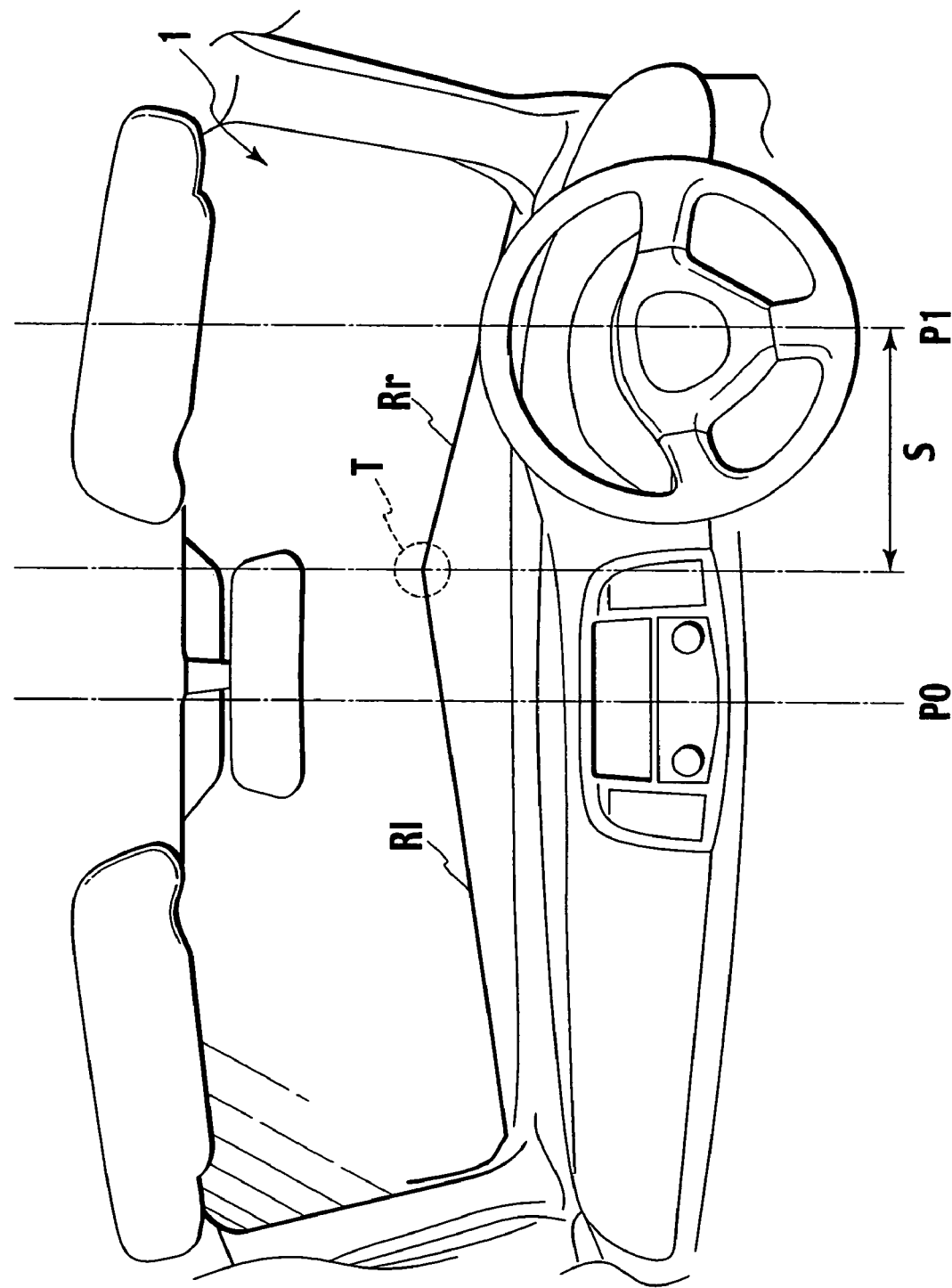
FIG. 2 is an explanatory view of a method of adjusting visibility for vehicle according to an embodiment of the present invention.
Figure 3:
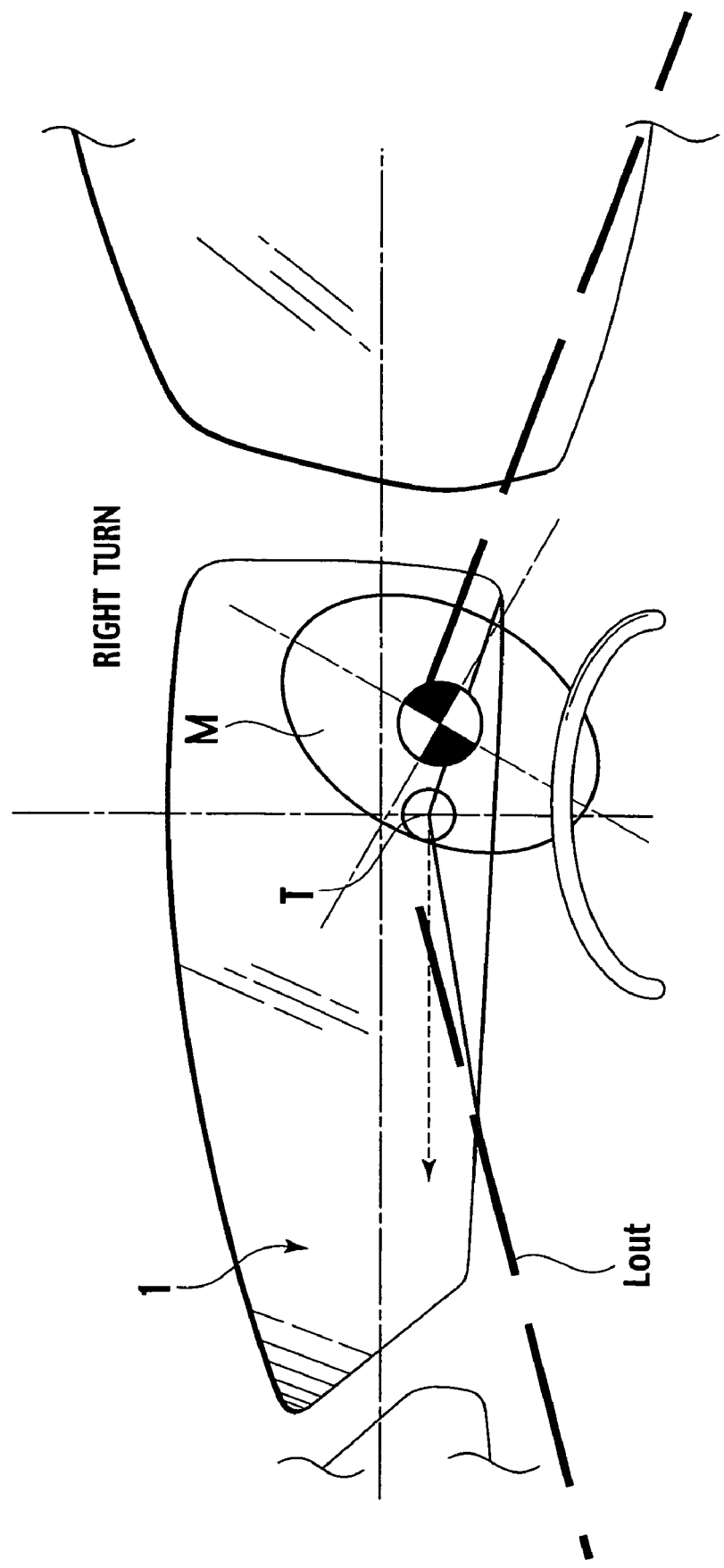
FIG. 3 is an explanatory view showing a relation between a parting line and forward visibility as viewed from a driver in the embodiment of the present invention.
Figure 4:
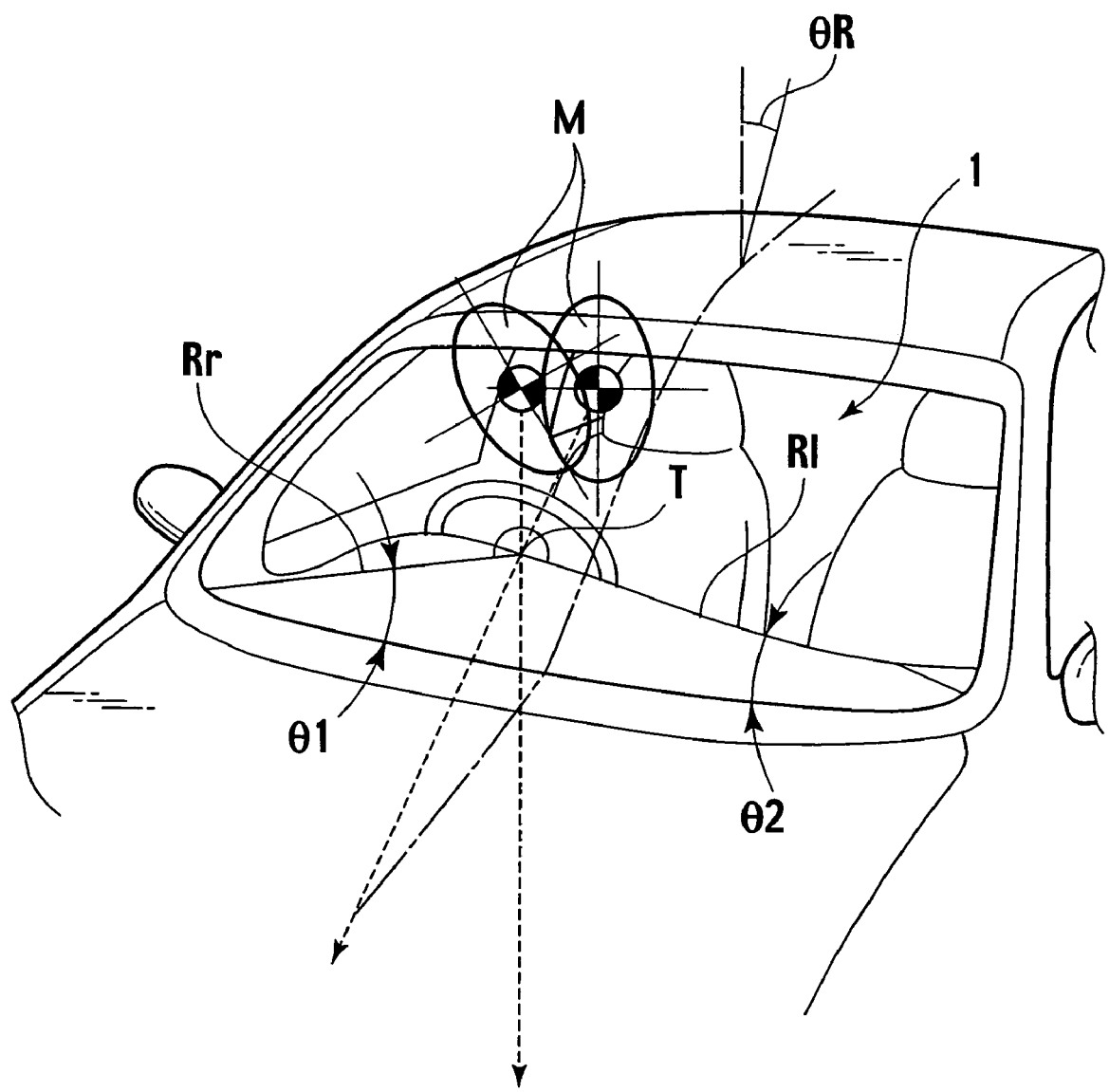
FIG. 4 is an explanatory view showing a relation between a line of vision of the driver and an apex of the parting line in the embodiment of the present invention.

In the method of adjusting visibility for vehicle according to the embodiment of the present invention, as shown in FIG. 2, a virtual parting line is first provided which has an apex T disposed between a position P1 opposed to a driver and a vehicle center position P0 and at a position on a windshield 1 that is deviated from the opposed position P1 by a distance S, and also has left and right ridgelines Rl and Rr uniformly inclining downward from the apex T toward opposite sides in a vehicle-width direction. As shown in FIG. 3, the apex T is located so that a line which connects the apex T and a viewpoint of a driver M taking a turning posture is outside a turning outer side lane Lout when a right-hand drive vehicle turns to the right (turns to the left if the vehicle is a left-hand drive vehicle). In addition, as shown in FIG. 4, when the maximum angles of inclination formed between a horizontal line and the ridgeline on the side of the driver, i.e., the right ridgeline Rr in the case of the right-hand drive vehicle and the left ridgeline Rl in the case of the left-hand drive vehicle, are defined as θ1 and θ2, respectively, they are set greater than a roll angle $θ_R$ of the vehicle.

Figure 5:
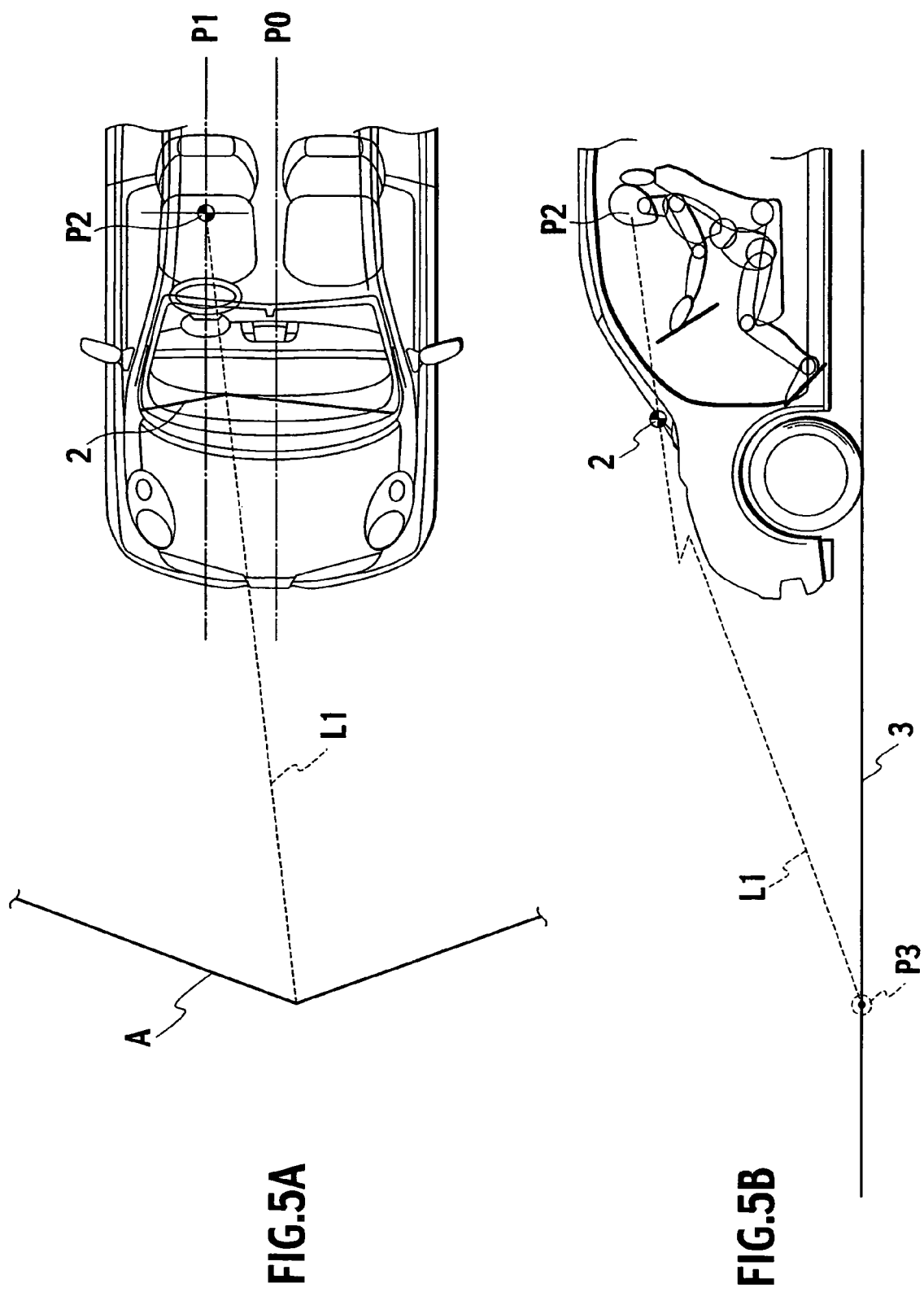
FIGS. 5A and 5B are explanatory views showing a relation between the parting line and a virtual line segment in the embodiment of the present invention.

When the virtual parting line is disposed in the above manner, a straight line L1 is assumed which passes through a point on the parting line and the viewpoint P2 of the driver (eye position of the driver when making driving operations in a standard state), and a set of points at which the straight line L1 intersects with a road surface 3 is calculated to be a virtual line segment A, as shown in FIGS. 5A and 5B. Specifically, a line segment formed by projecting the parting line 2 onto the road surface 3 from the viewpoint P2 of the driver is calculated to be the virtual line segment A. Subsequently, as shown in FIG. 6, an illumination property of headlights 4 is controlled so that light quantity or color in a belt-like region B including the virtual line segment A is different from those in other regions.

Figure 6:
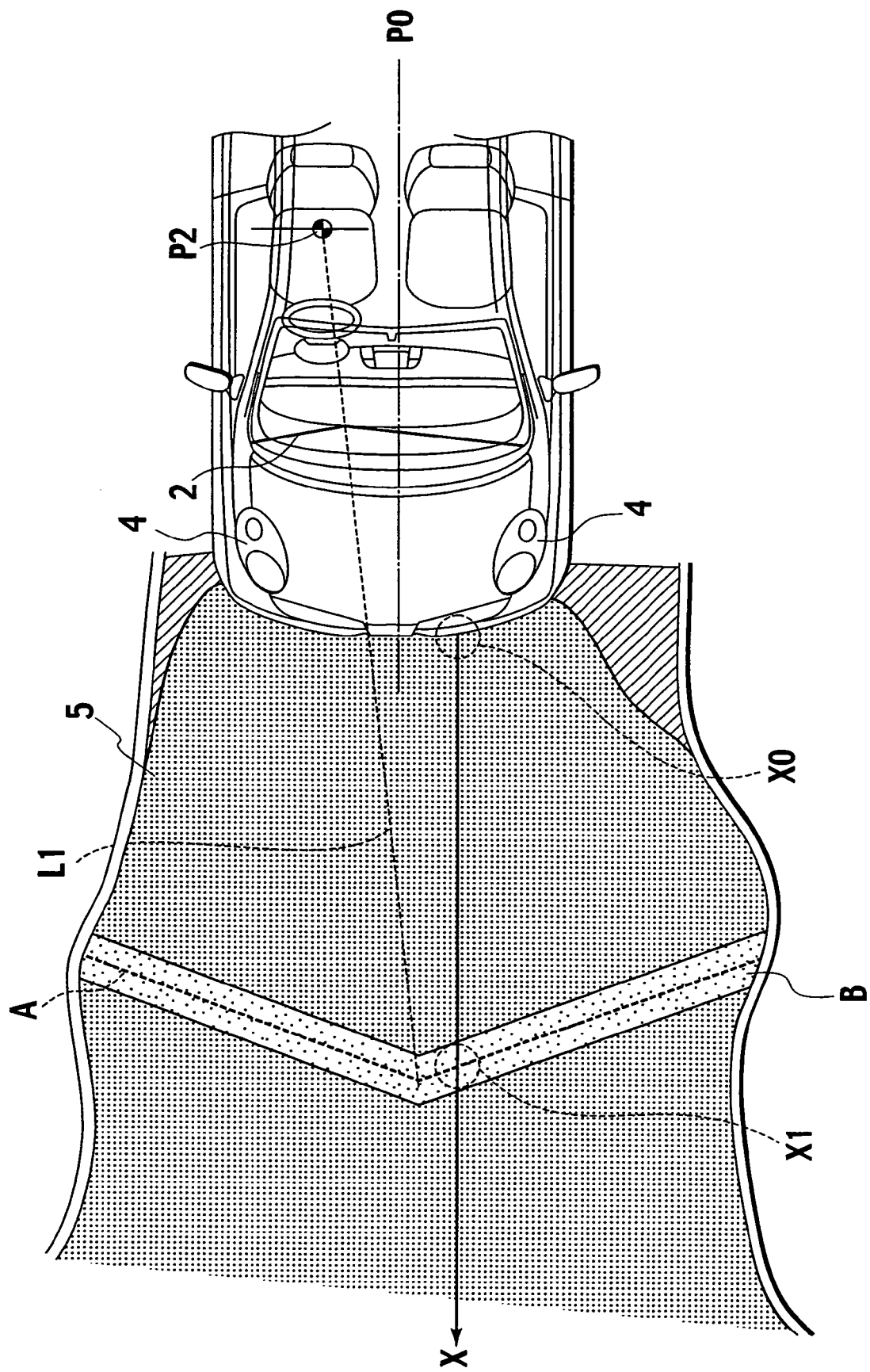
FIG. 6 is an explanatory view of the method of adjusting visibility for vehicle according to the embodiment of the present invention.
Figure 9A:
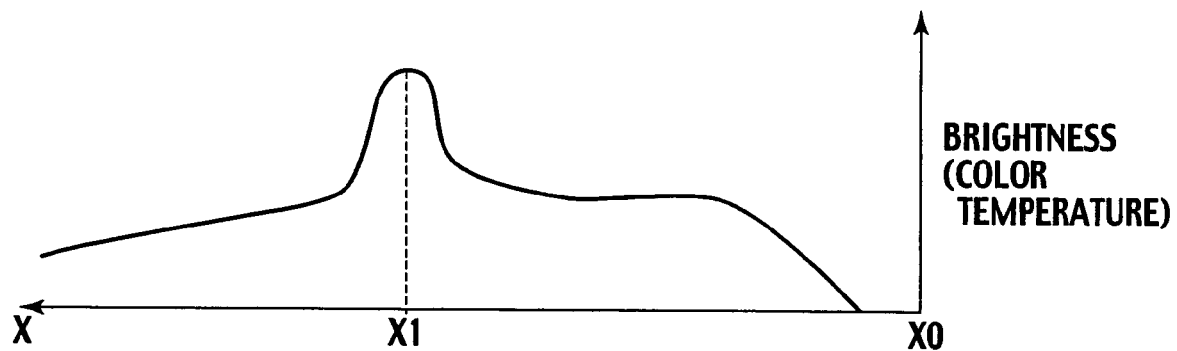
FIGS. 9A to 9D show illumination properties of headlights in the embodiment of the present invention.

FIG. 6 shows an example where the illumination property of the headlights 4 is controlled so that the belt-like region B is brighter than other regions, as shown in FIG. 9A which will be described later. It is, however, also allowable to control the illumination property of the headlights 4 by taking another form such that the belt-like region B is made darker than other regions or a color of the belt-like region B is different from that of other regions, as long as the belt-like region B is distinguishable from other regions. Furthermore, this embodiment exemplifies the case where the illumination property of the headlights 4 is controlled according to the parting line 2. It is, however, also allowable to control the illumination property of the headlights 4 without assuming the parting line 2 so that a contrast between light and darkness or a difference in color temperature forms a convex shape in a vehicle forward direction.

Figure 7:
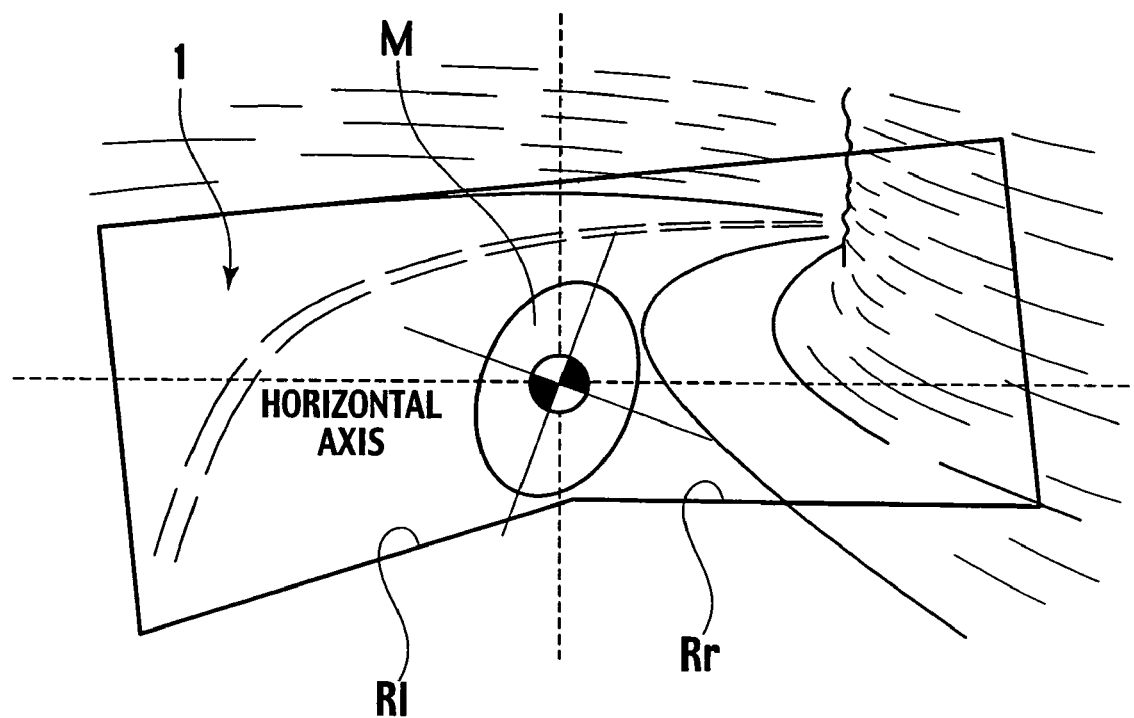
FIG. 7 is an explanatory view showing a forward visibility when a vehicle makes a right turn in the embodiment of the present invention.
Figure 8:
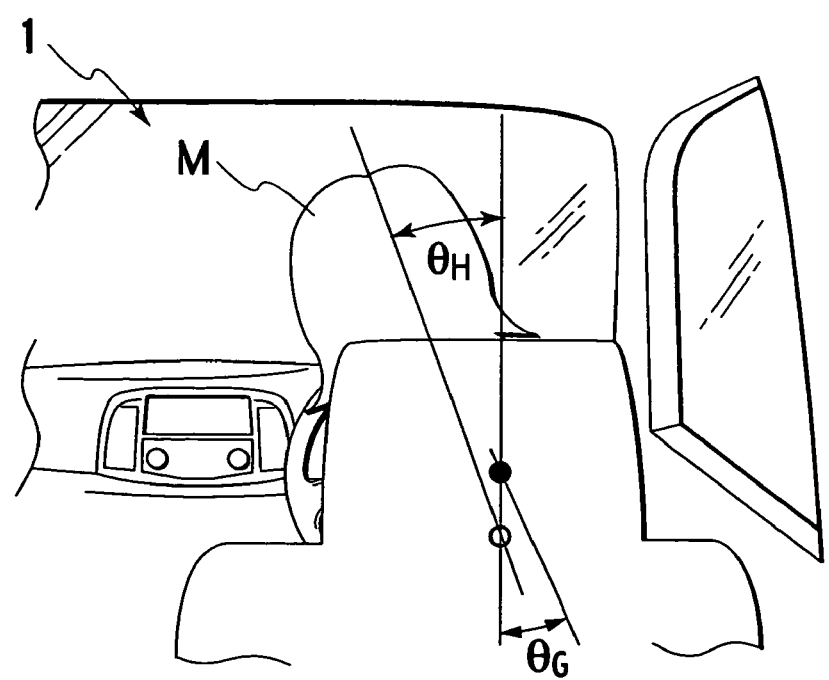
FIG. 8 is an explanatory view showing a relation between a head angle and a pendulum angle when the vehicle turns in the embodiment of the present invention.

As is clear from the above description, in the method of adjusting visibility for vehicle according to the embodiment of the preset invention, the illumination property of the headlights 4 is controlled so that light quantity or color in the belt-like region B including the virtual line segment A is different from those in other regions, so as thereby to indicate on a road surface the virtual line segment A which uniformly inclines downward from the apex T deviated from the driver toward the opposite sides in the vehicle-width direction. With this configuration, the virtual line segment A is, as viewed from the driver, equivalent to the parting line Rl, Rr indicated at a lower end of a windshield as shown in FIG. 7. This virtual parting line can suppress the inclination of the forward visibility and also can suppress the sway of a head inclination angle θH (see FIG. 8) at the time of turning, which leads to stable driver's driving posture and suppression of steering disturbance in driving at night.

According to the conventional method of adjusting visibility in which a visibility adjusting portion is provided at a lower end of a windshield, there is less contrast between the visibility adjusting portion and the forward visibility in driving at night. Therefore, the effect of stabilizing a sense of balance of a driver is sometimes eliminated. As a solution to such a problem, a possible method is to provide a contrast by causing the visibility adjusting portion to emit light or by applying light from a light source to the visibility adjusting potion so as to lighten it. However, when the inside of a vehicle is lightened in driving at night, another problem arises that reflection onto a windshield occurs, or the like.

Furthermore, a rear end of an illuminated region by headlights (an end of the illuminated region nearer to the vehicle) is typically 20 meters ahead of the vehicle to assure the forward visibility on the road surface ahead. Moreover, in an area ranging from the rear end of the illuminated region to an invisible region obstructed by the vehicle body as viewed from a driver's seat (the area ranging from approximately 5 to 10 meters ahead from the front end of the vehicle), there is a contrast varying region (shade) having light and dark irregularities depending on the structure of the headlights or the vehicle form, and this shade varies sensitively in response to driver's driving posture because the headlights illuminate the road surface at a small angle. The variations in the shade sometimes disturb a sense of balance of a driver because those variations are within his/her peripheral vision.

In contrast to this, in the method of adjusting visibility for vehicle according to the embodiment of the present invention, the forward visibility of a driver is not adjusted by providing the visibility adjusting portion on the windshield 1 as in the conventional method, but is adjusted by indicating the virtual line segment A on a road surface and showing the parting line 2 as if it is on the windshield 1, as previously mentioned. Therefore, even in driving at night when a contrast between the windshield 1 and a surrounding environment becomes small, a sense of balance of a driver can be continuously stabilized. Also in driving in daytime, the parting line 2 is actually indicated on the windshield, thereby stabilizing a driving posture and suppressing steering disturbance.

Figure 9B:
Figure 9C:
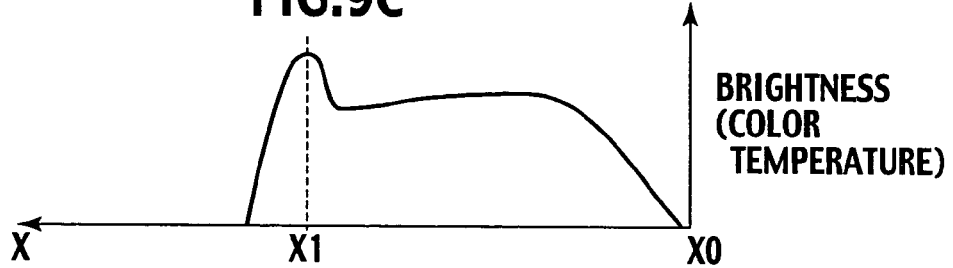
Figure 9D:
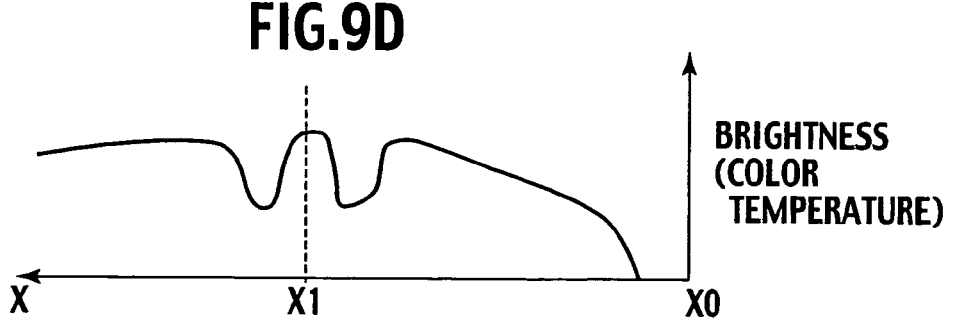

In this embodiment, as shown in FIG. 9A, the illumination property of the headlights 4 is controlled so that the brightness (or color temperature) in the belt-like region B (the region around a coordinate location of X1, where X0 indicates a front end position of a vehicle) may be higher than that in other regions. It is, however, also allowable to control the illumination property of the headlights 4 so that the position of the rear end of the illuminated region by the headlights 4 may agree with the position of the belt-like region B, as shown in FIG. 9B. Opposite to this, as shown in FIG. 9C, it is also allowable to control the illumination property of the headlights 4 so that the position of the front end of the illuminated region by the headlights 4 agrees with the position of the belt-like region B. When the illumination property of the headlights 4 is controlled in this manner, it is likely that regions adjacent to the belt-like region B become darker than other regions as shown in FIG. 9D, because light quantity around the belt-like region B is relatively decreased when light is concentrated in the belt-like region B. However, the effect of the present invention can be adequately obtained even with such an illumination property.

Moreover, although the illumination property of the headlights 4 is controlled so that light is concentrated onto the belt-like region B in this embodiment, the illumination property of the headlights 4 may also be controlled so that a focal point of the entire or some portion of a reflecting mirror or lens which composes the headlights 4 is located near the virtual line segment A. For example, when the illumination property of the headlights 4 is controlled by the shape of the reflecting mirror, it is configured so that the focal point of the reflecting mirror may be located at an arbitrary position on a line which connects the headlights 4 with the virtual line segment A.

Figure 10A:
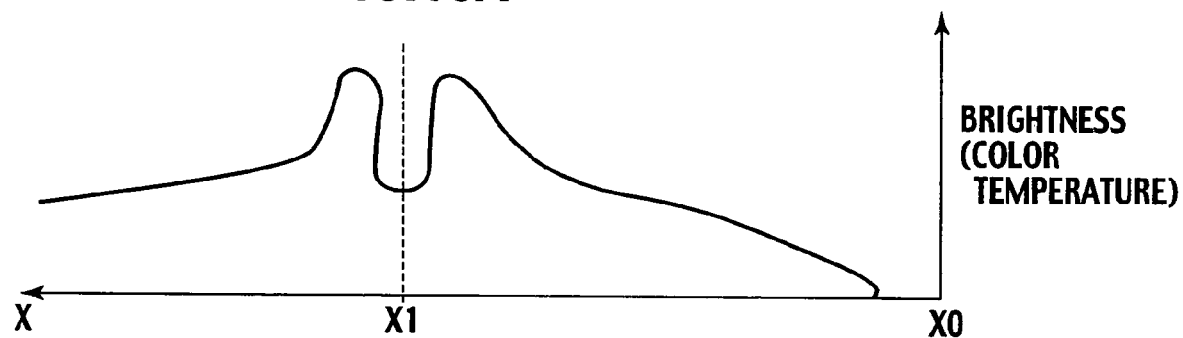
FIGS. 10A to 10C also show illumination properties of the headlights in the embodiment of the present invention.
Figure 10B:
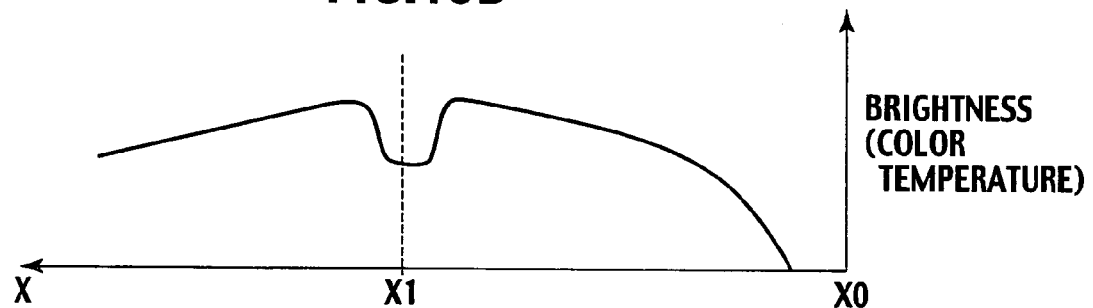
Figure 10C:
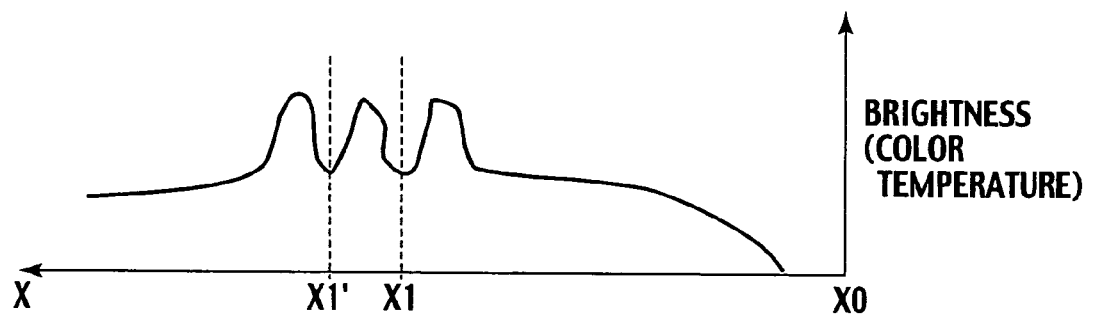

Furthermore, although the illumination property of the headlights 4 is controlled so that only the belt-like region B is brighter than other regions in this embodiment, the illumination property of the headlights 4 may also be controlled so that regions adjacent to the belt-like region B are brighter than other regions, as shown in FIG. 10A. In addition, by making gentle a light-concentration property on the regions adjacent to the belt-like region B, the illumination property of the headlights 4 may be controlled so that the belt-like region B is darker than other regions, as shown in FIG. 10B. Moreover, as long as a virtual line segment A on an upper end (virtual line segment farthest from the front end of the vehicle) is clearly indicated by a contrast, two or more virtual line segments may be indicated by concentrating light onto three or more regions lying in front of and behind the respective virtual line segments, as shown in FIG. 10C.

Next descriptions will be given, by way of some examples, of a configuration of the visibility adjusting apparatus in the case of adjusting the forward visibility of a driver in the above-described manner.

EXAMPLE 1

Figure 11A:
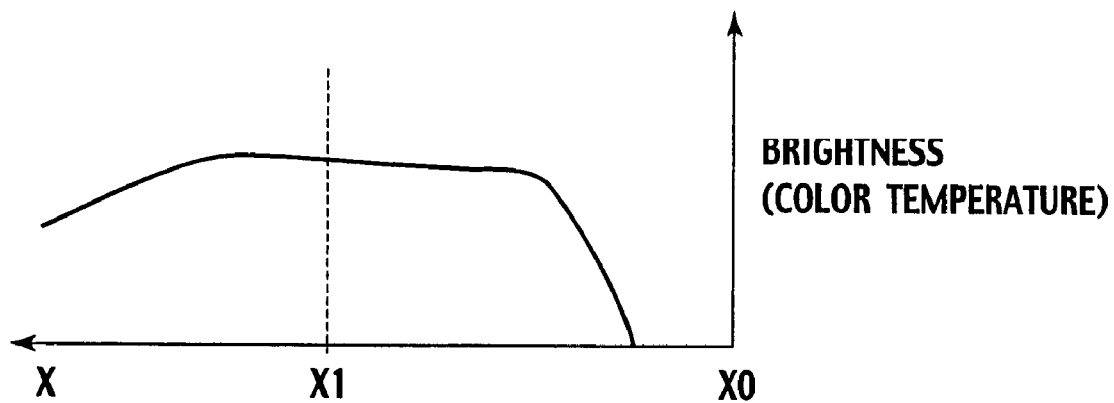
FIGS. 11A and 11B show an illumination property of ordinary headlights.
Figure 11B:
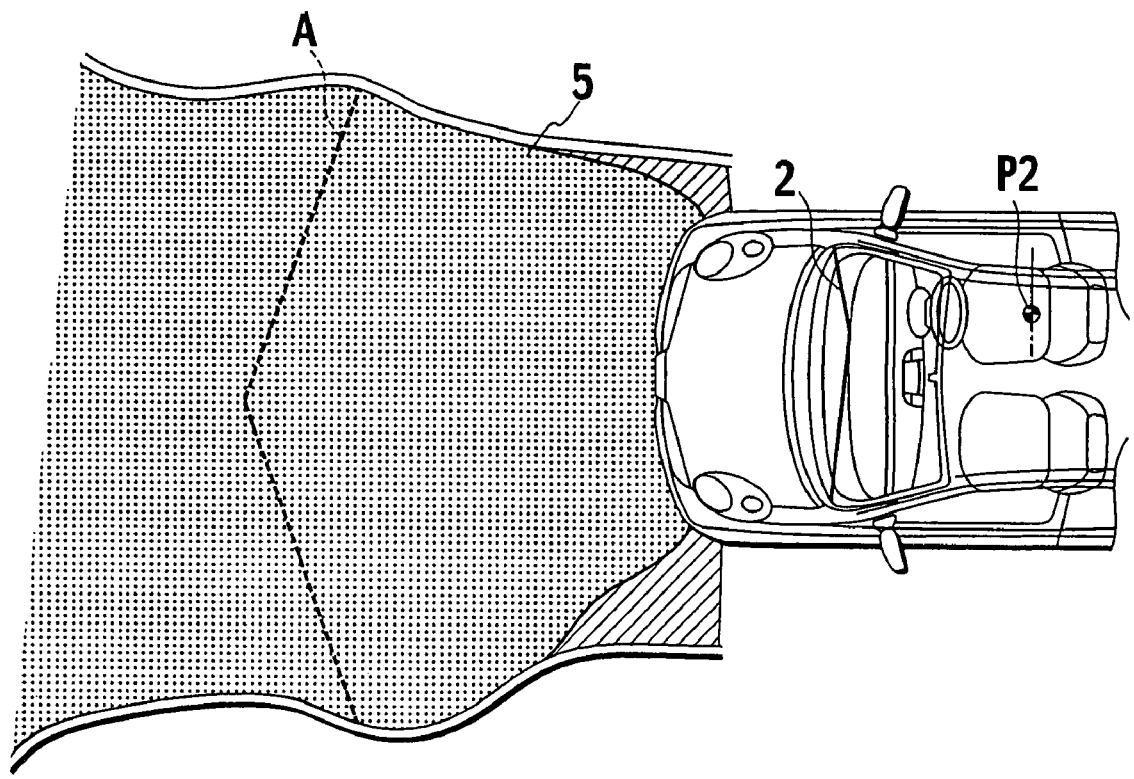
Figure 12A:
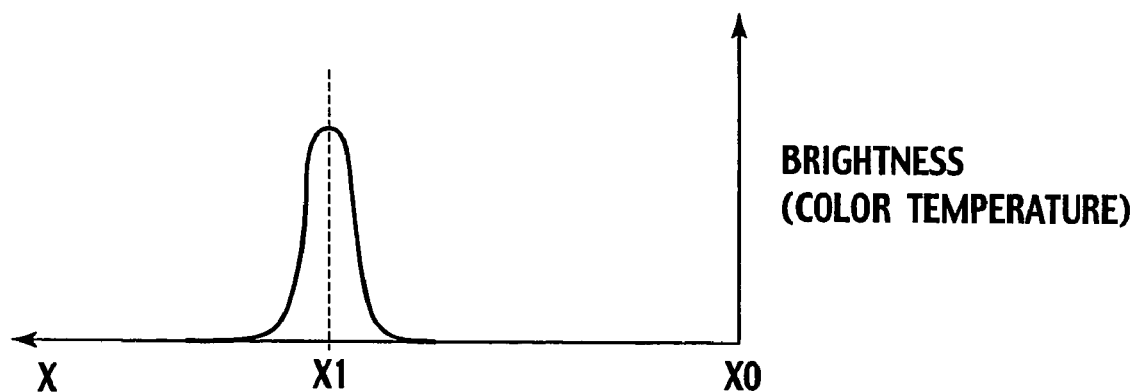
FIGS. 12A and 12B show an illumination property of auxiliary headlights in the embodiment of the present invention.
Figure 12B:
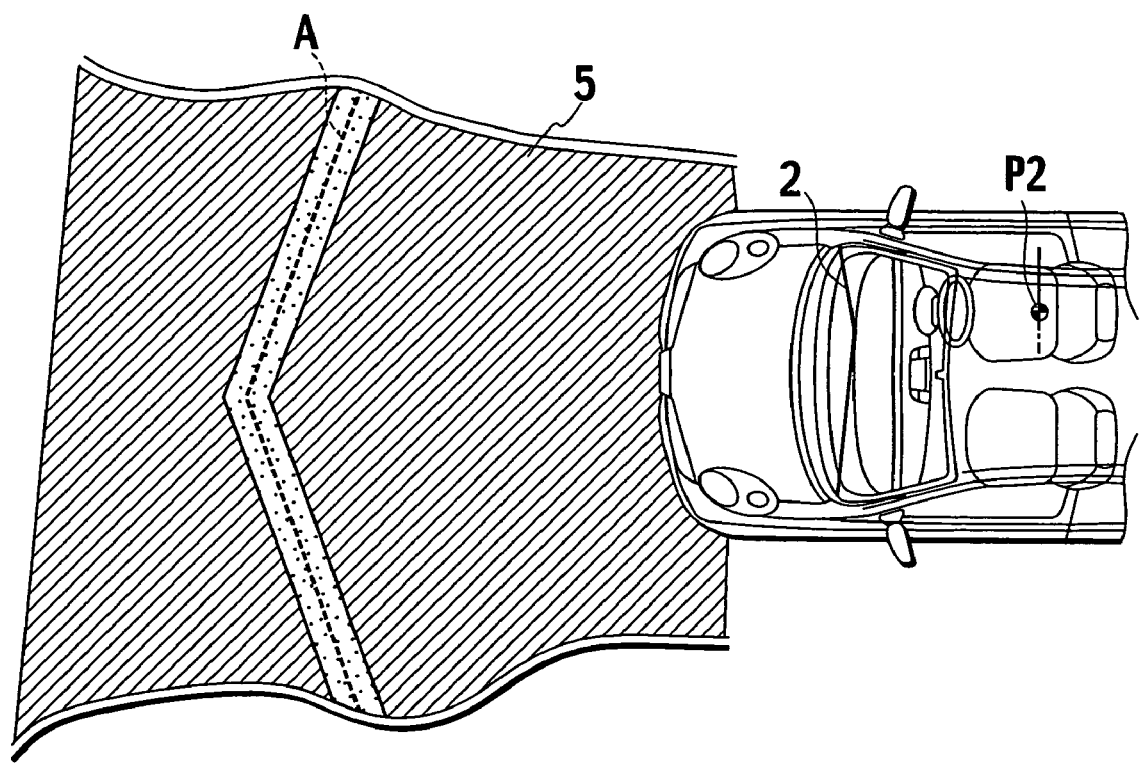
Figure 13:
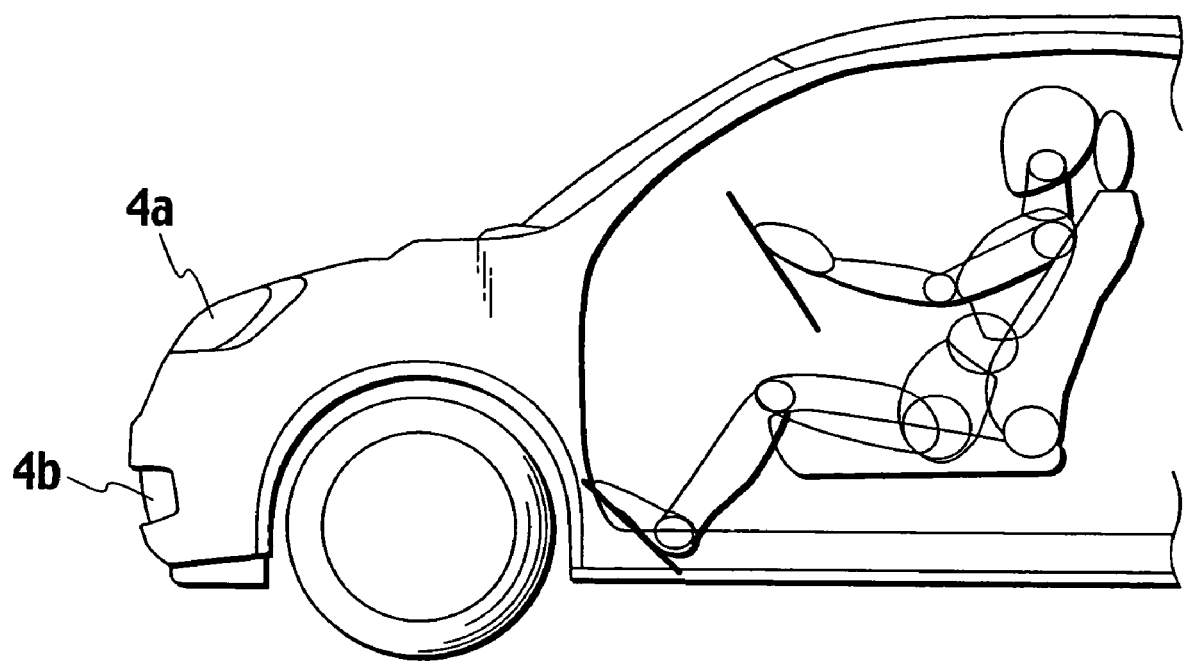
FIG. 13 shows a structure of a visibility adjusting apparatus for vehicle in the embodiment of the present invention.

A vehicle is typically provided with at least a pair of left and right headlights. An illumination property thereof is slightly different depending on laws and regulations in each country, but is of uniformly illuminating a road surface in front as shown in FIG. 11. When the illumination property of the headlights 4 is controlled to provide such uniform illumination, an auxiliary headlight 4b having a property of illuminating only the belt-like region B (see FIG. 12), such as a fog lamp, can be provided as shown in FIG. 13 in addition to the headlights 4a, so that brightness (color temperature) of the belt-like region B can be higher than that of other regions as already shown in FIG. 9A. Moreover, at this time if the illumination property of the auxiliary headlight 4b is controlled so that it has two peaks of luminosity, an illuminated region can be formed having a luminance distribution as already shown in FIG. 10A.

As compared with a technique of varying the brightness of the belt-like region B by changing the light-concentration property of the headlights, the visibility adjusting apparatus having the above configuration is able to more clearly indicate an illumination pattern on a road surface for a driver, and enhance the effect of stabilizing a sense of balance. In addition, since the illumination pattern is indicated by use of different illumination colors, this pattern is maintained on the road surface even when the illumination capability of the auxiliary headlight is low, so that the cost can be reduced and a difference in brightness of the illumination for forward view can be held small. Furthermore, for vehicles which the present invention is not applied to, it becomes possible to apply the present invention thereto by retrofitting the headlights.

As to setting an illumination color of the headlights, since the current regulations stipulate that the color of headlights must be white or yellow, it is appropriate to set, for example, the color of auxiliary headlights and the color of main headlights to yellow (color temperature: low) and white (color temperature: high), respectively. Furthermore, a vehicle is allowed to have at least one auxiliary headlight in the present invention, but particularly in Japan, it is prohibited by regulations to have and use an odd number of headlights. Therefore, it is desirable to provide a pair of auxiliary headlights on either side.

EXAMPLE 2

Figure 14:
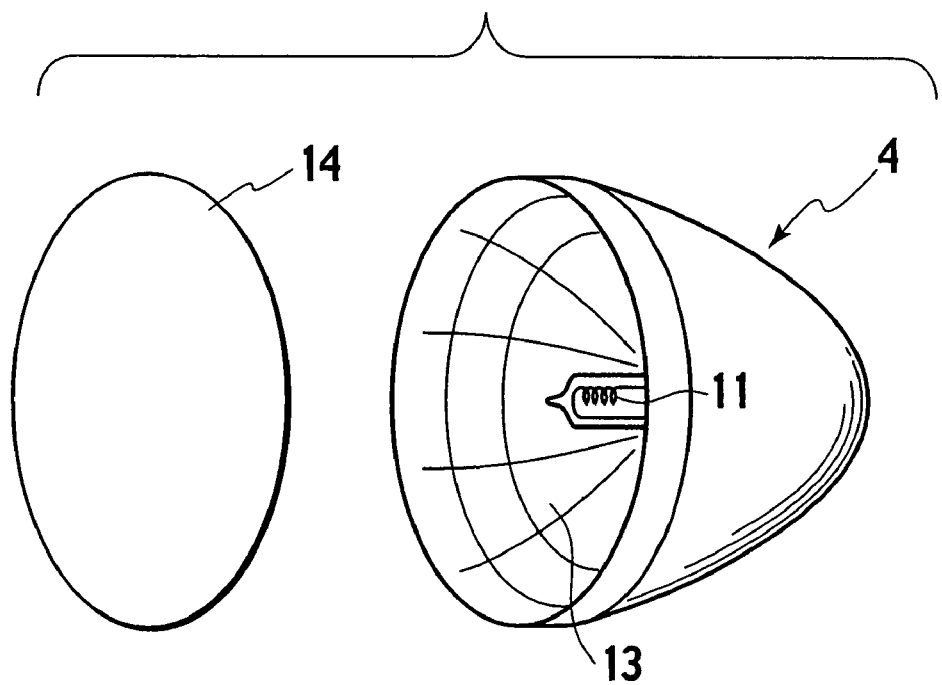
FIG. 14 is an exploded perspective view showing a structure of ordinary headlights.
Figure 15:
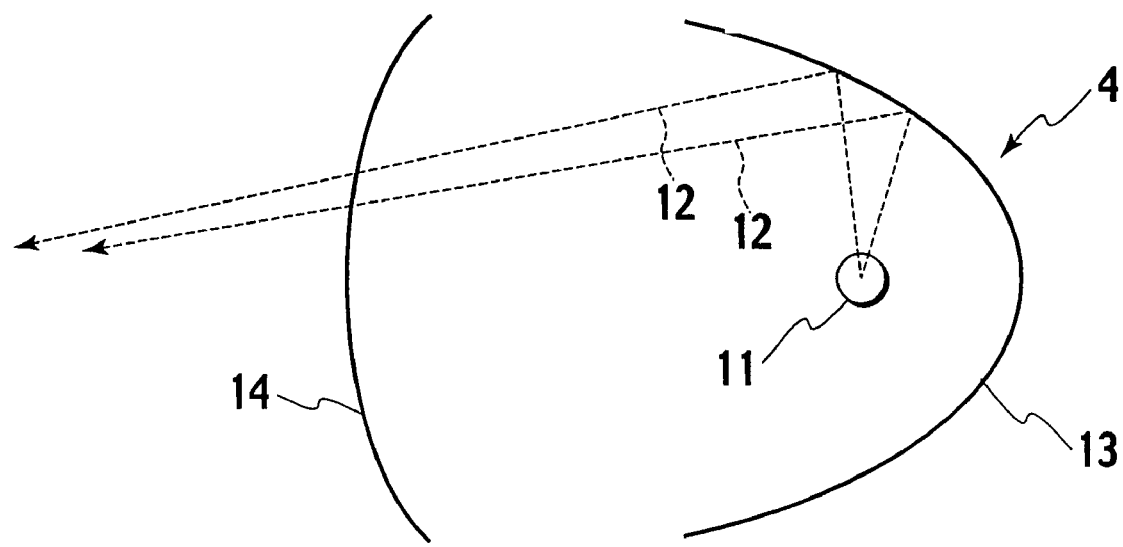
FIG. 15 is a sectional view showing the structure of ordinary headlights.
Figure 16A:
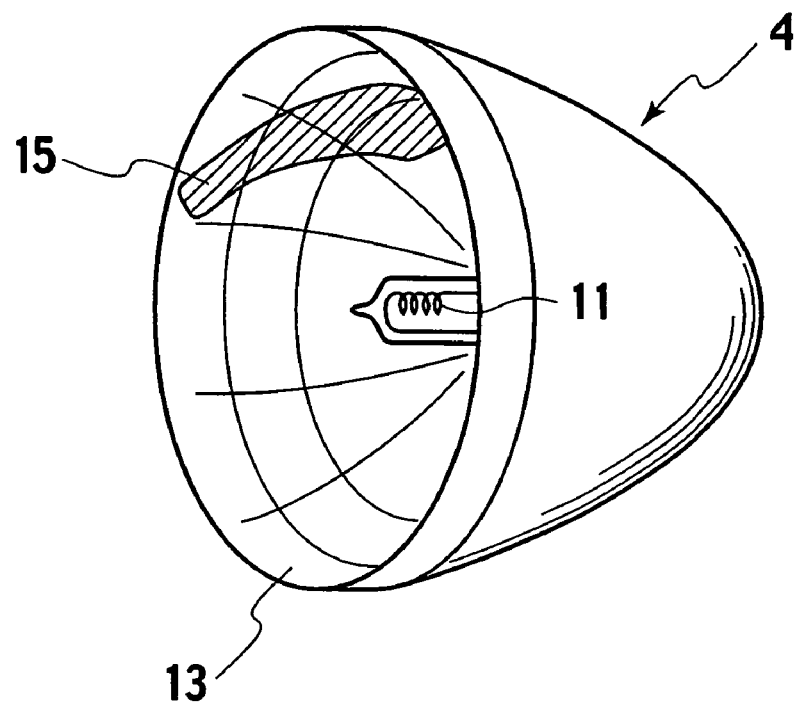
FIGS. 16A and 16B show a structure of headlights in the embodiment of the present invention.
Figure 16B:
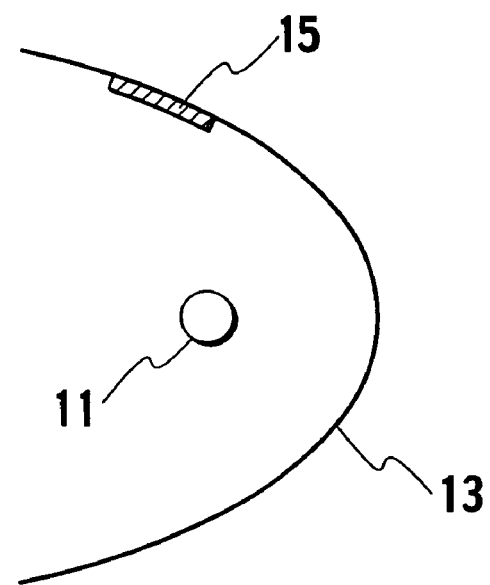

In the conventional headlight configuration, light emitted from a light source is reflected by a reflecting mirror, and the reflected light is then concentrated with a lens provided on the surface of the headlight, so as thereby to illuminate a road surface in front of a vehicle. In the current headlight configuration, however, as shown in FIGS. 14 and 15, with the advance of recent shaping technology or designing technology, a portion which seems like a lens 14 merely serves as a cover, and a reflection angle of light from a light source 11 on the reflecting mirror 13 is controlled so that light 12 may illuminate a road surface. Therefore, by setting an angle of a reflecting mirror area 15 (see FIG. 16) for illuminating the belt-like region B in the following manner, the belt-like region B can be indicated on the road surface, and thus a sense of balance of a driver can be stabilized. Now referring to FIG. 17, a method of setting an angle of the reflecting mirror area 15 will be explained below.

Figure 17:
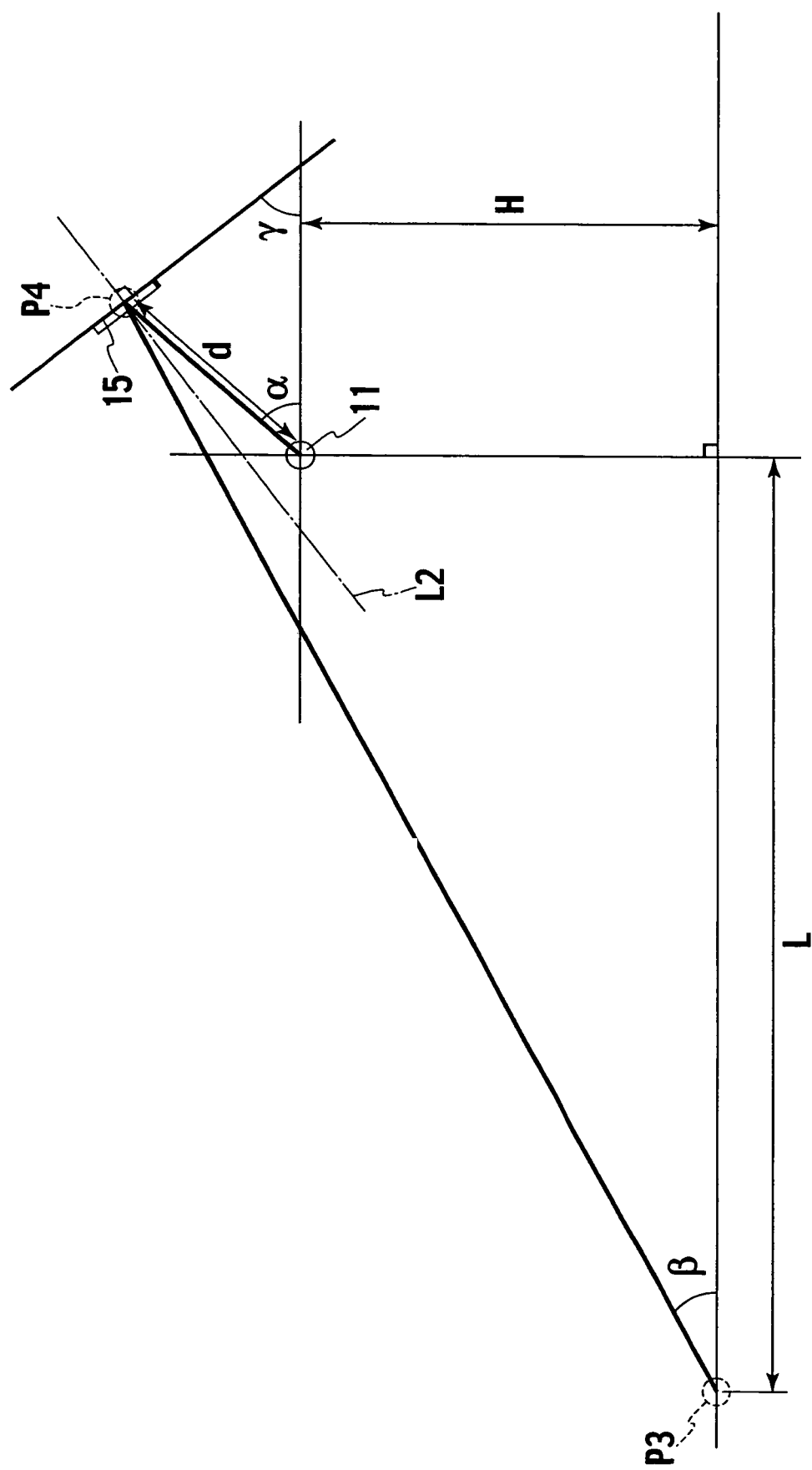
FIG. 17 is an explanatory view of an illumination property of the headlights shown in FIGS. 16A and 16B.

FIG. 17 shows a positional relation between a light illuminated region and the reflecting mirror. In this positional relation of FIG. 17, assuming that a distance from the light source 11 to the reflecting mirror area 15 is represented by d, a point on the reflecting mirror area 15 which forms an angle α with the horizontal plane of the light source 11 as viewed therefrom is represented by P4, a horizontal distance from the light source 11 to a position P3 which corresponds to the virtual line segment A is represented by L, and a distance from the road surface to the light source 11 is represented by H, an angle β formed between the road surface and a line segment P3P4 is determined from the following equation:

$$\beta = \tan^{-1}\left(\frac{H + d\sin\alpha}{L + d\sin\alpha}\right) \quad (1)$$

Accordingly, an angle γ of the reflecting mirror area 15 to the horizontal plane, which is necessary to concentrate light from the light source 11 onto the belt-like region including the virtual line segment A, is determined by the equation shown below by use of the angle β calculated from the above equation. That is, by setting the angle of the reflecting mirror area 15 to the angle γ calculated from the equation shown below, the belt-like region B can be indicated on the road surface, and a sense of balance of a driver can be stabilized. It is to be noted here that setting the angle of the reflecting mirror area 15 to the angle γ calculated from the equation shown below is exactly the same as setting the angle of the reflecting mirror area 15 so that the surface of the reflecting mirror area 15 may be orthogonal to a line segment L2 which equally divides an angle formed between the line segment P3P4 and a line segment that connects the light source 11 with the point P4.

$$\gamma = \left(\frac{2}{\alpha + \beta}\right) \quad (2)$$

The reflecting mirror area 15 of which angle is set in the above-described manner may have a continuously curved surface that strictly meets the angle calculated from the equation (2), or alternatively have a polyhedral surface having curvature by combining planes together which approximately meet the angle calculated from the equation (2). In either of these two ways, there is not much difference in the illumination pattern that actually appears on a road surface because light reaches the road surface ahead while slightly diffusing. In this example, the angle of the reflecting mirror area 15 is set so that light comes into a focus on the position of the virtual line segment A. In the present invention, however, it is only necessary to illuminate a finite region including the virtual line segment A distinctly brighter than the surroundings. Therefore, the reflecting mirror area 15 whose reflection light comes into a focus, for example, below or above the road surface, may be provided with a property of concentrating light onto the finite region on the road surface.

EXAMPLE 3

Figure 18A:
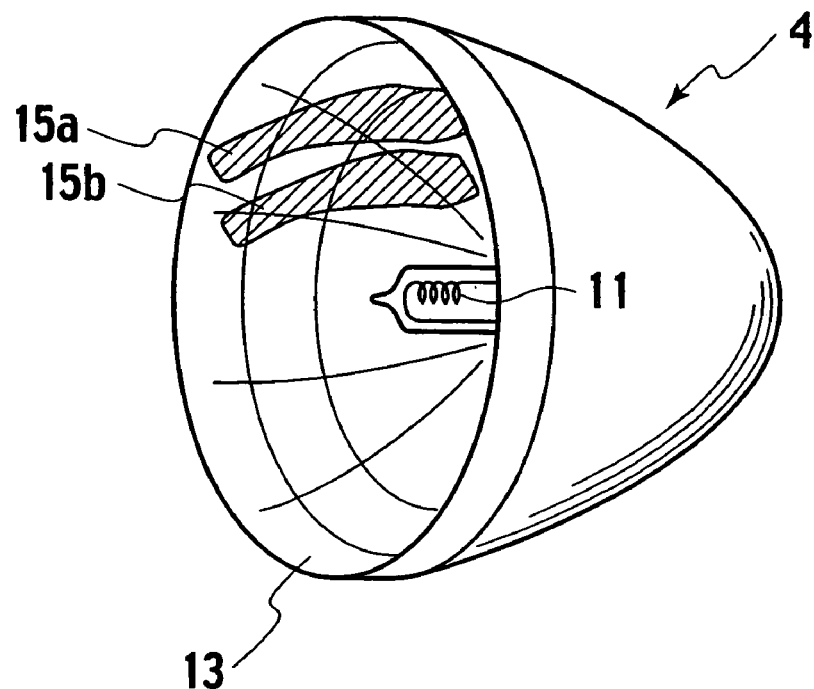
FIGS. 18A and 18B show another structure of the headlights in the embodiment of the present invention.
Figure 18B:
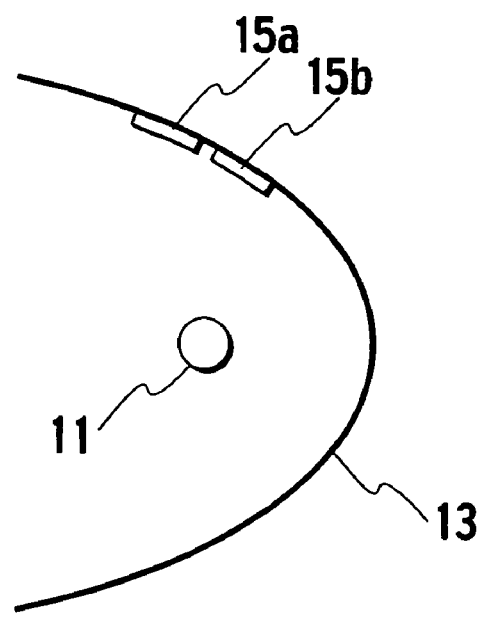
Figure 19:
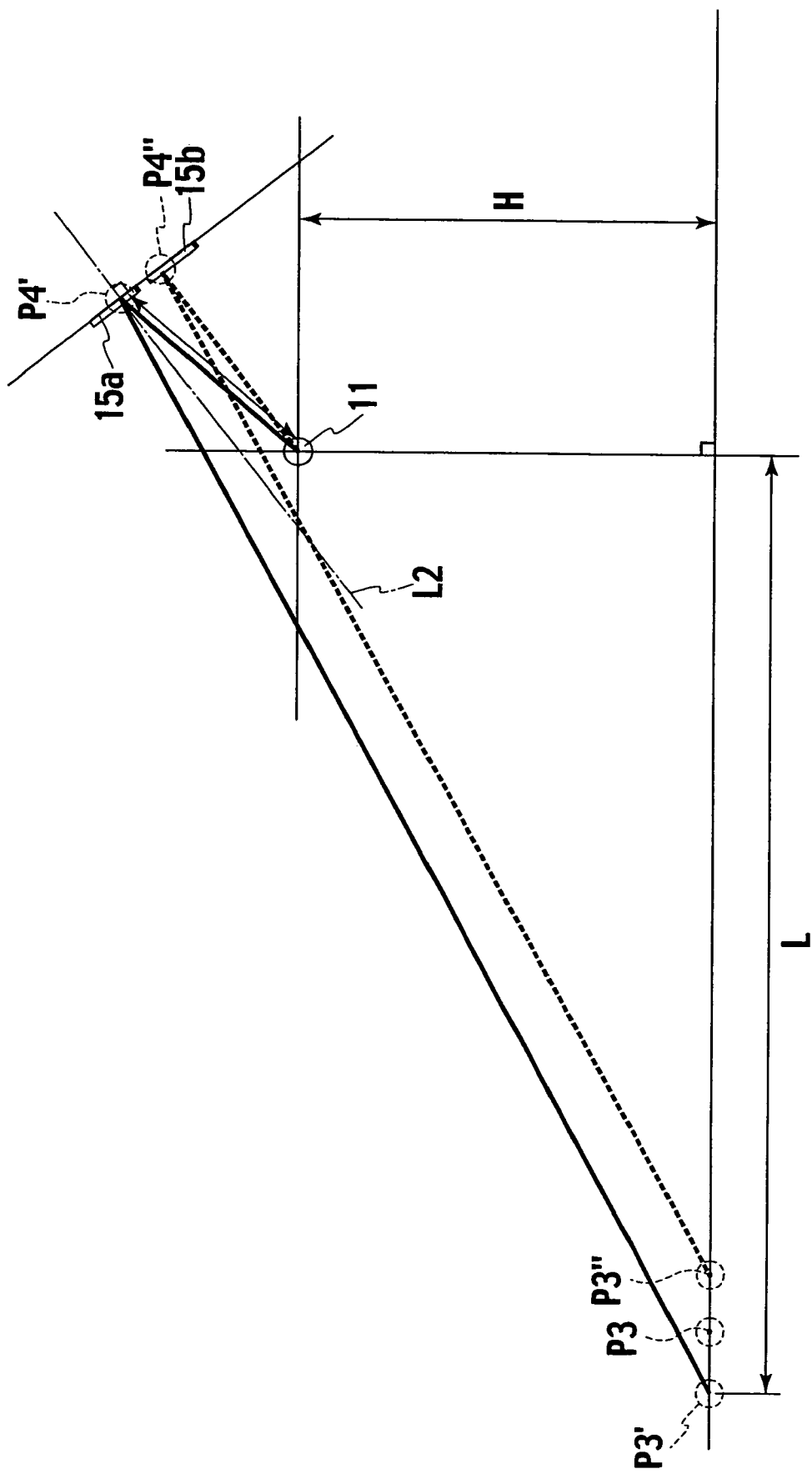
FIG. 19 is an explanatory view of an illumination property of the headlights shown in FIGS. 18A and 18B.

In the second example, the angle of one area on the reflecting mirror is set. It is, however, also allowable to concentrate light onto two areas as already shown in FIG. 10A by setting angles of two areas 15a and 15b of the reflecting mirror as shown in FIG. 18, in order to stabilize a sense of balance of a driver. In this case, as specifically shown in FIG. 19, when the point P3 corresponding to the virtual line segment A on the road surface is assumed, additional points P3' and P3" are also assumed which correspond to virtual line segments lying in front of and behind the virtual line segment A and being similar thereto. Then, the angles of the reflecting mirror areas 15a and 15b are set so that lights emitted via the two reflecting mirror areas 15a and 15b may form images or come into their focuses at the points P3' and P3", respectively.

The angles of the reflecting mirror areas 15a and 15b can be calculated from the above equation (2). In this example, the reflecting mirror areas 15a and 15b are adjacent to each other in the reflecting mirror but they do not need to be adjacent, and may be provided, for example, in an upper end portion and lower end portion, respectively, of the reflecting mirror. Moreover, light is concentrated in two regions in this example, but may alternatively be concentrated in three or more regions as shown in FIG. 10C by setting angles of three or more areas of the reflecting mirror in the foregoing manner.

EXAMPLE 4

Figure 20A:
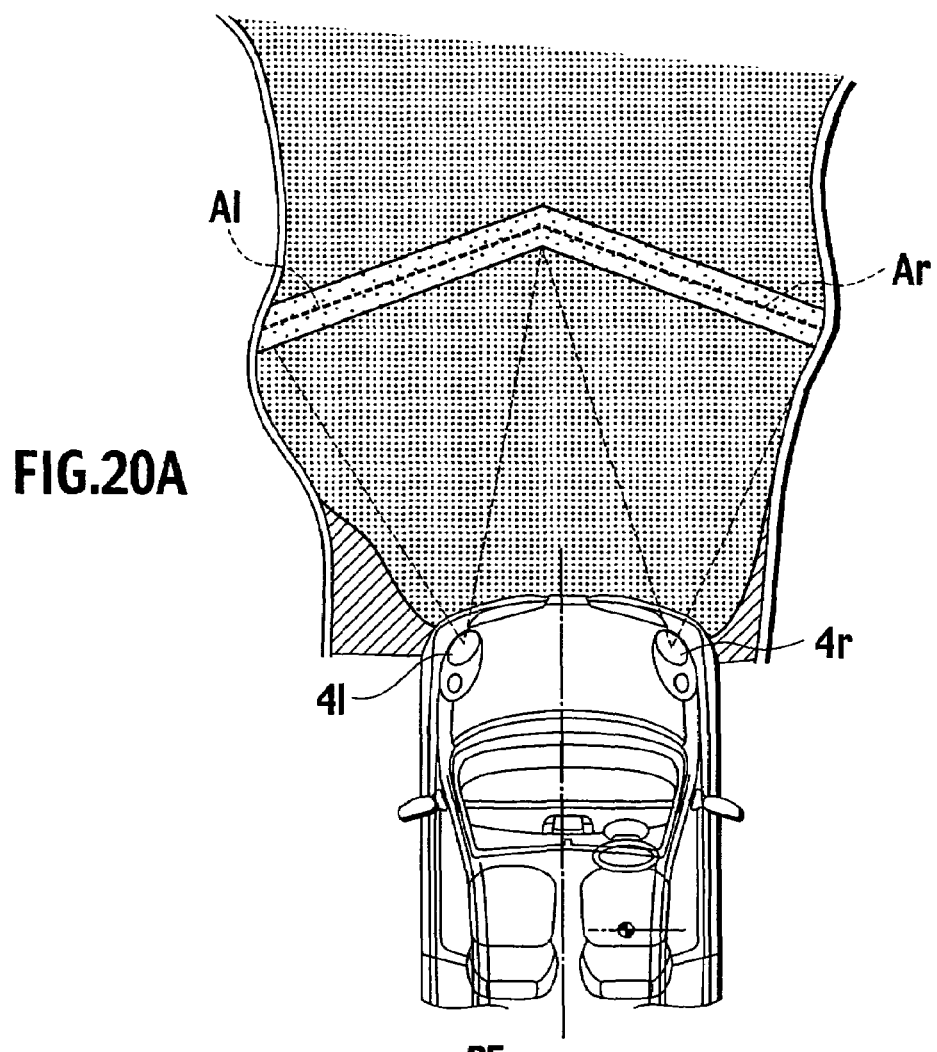
FIGS. 20A and 20B show an illumination property of the headlights in the embodiment of the present invention.
Figure 20B:
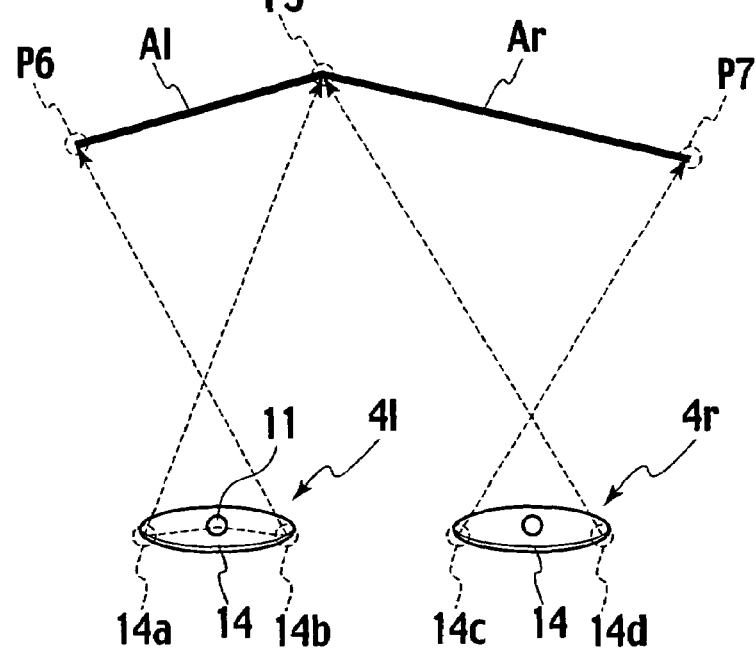
Figure 21A:
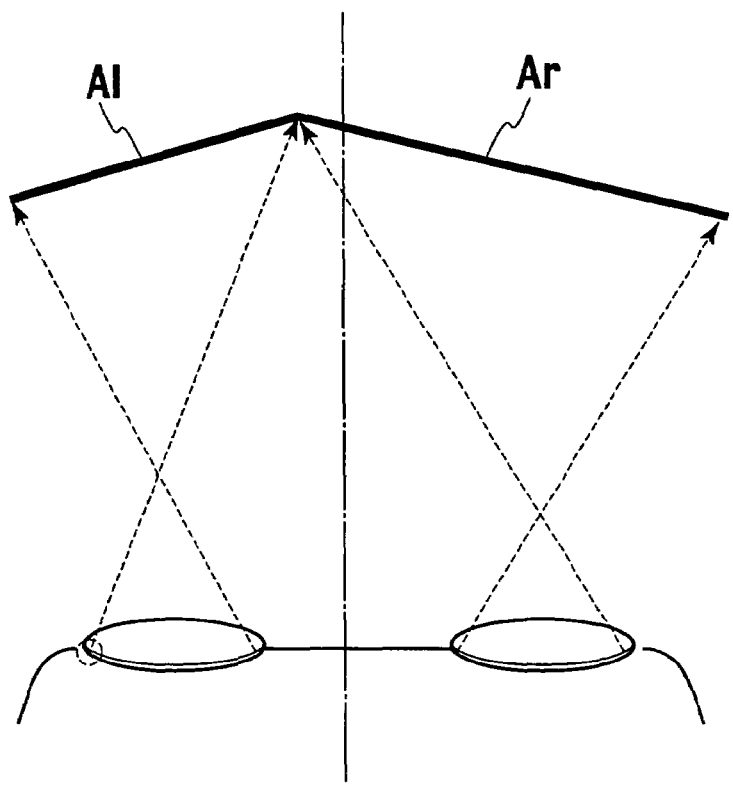
FIGS. 21A and 21B are explanatory views showing an illumination property of the headlights shown in FIGS. 20A and 20B while a vehicle is running in a normal state.
Figure 21B:
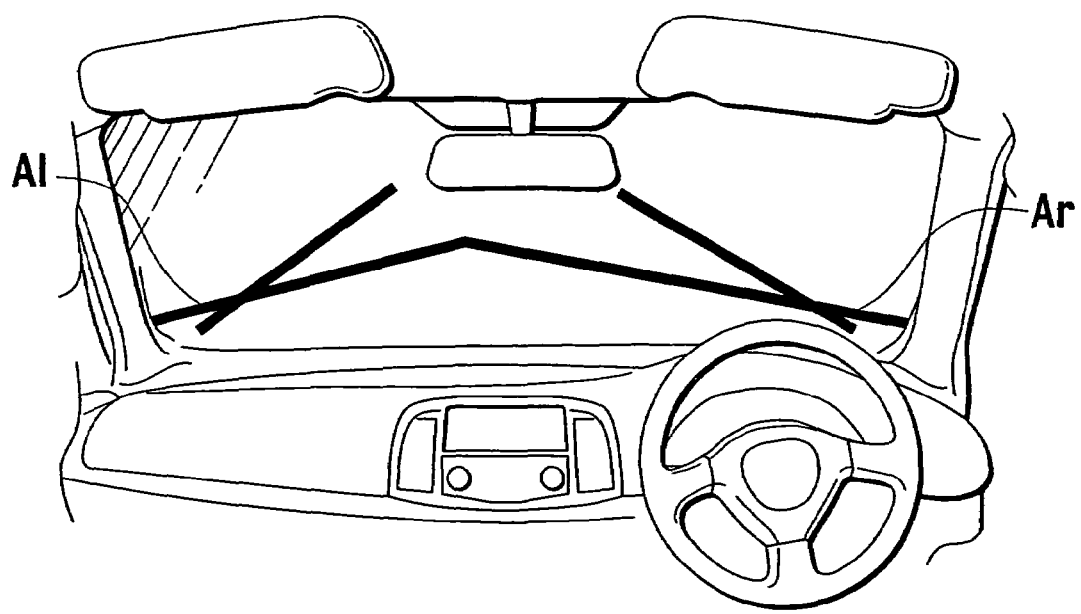

In a fourth example, as shown in FIG. 20, a left ridgeline Al of the virtual line segment A is illuminated by a headlight 41 on the left side of a vehicle, and a region on the left side of this left ridgeline Al is illuminated by a beam of light which passes through a right portion of the reflecting mirror 14 of the headlight 41. Specifically, a left end point P6 and a right end point P5 on the left ridgeline Al of the virtual line segment A are illuminated by beams of light which pass through a right end point 14b and a left endpoint 14a, respectively, of the reflecting mirror 14. That is, the angle of the reflecting mirror 14 is set so that the beams of light which come from the light source 11 via the reflecting mirror 14 to illuminate the road surface and provide an illumination pattern may be directed so as to cross each other as viewed from above the vehicle. Though the description herein is only given of the left ridgeline Al, the same will apply to the right ridgeline Ar.

Figure 22A:
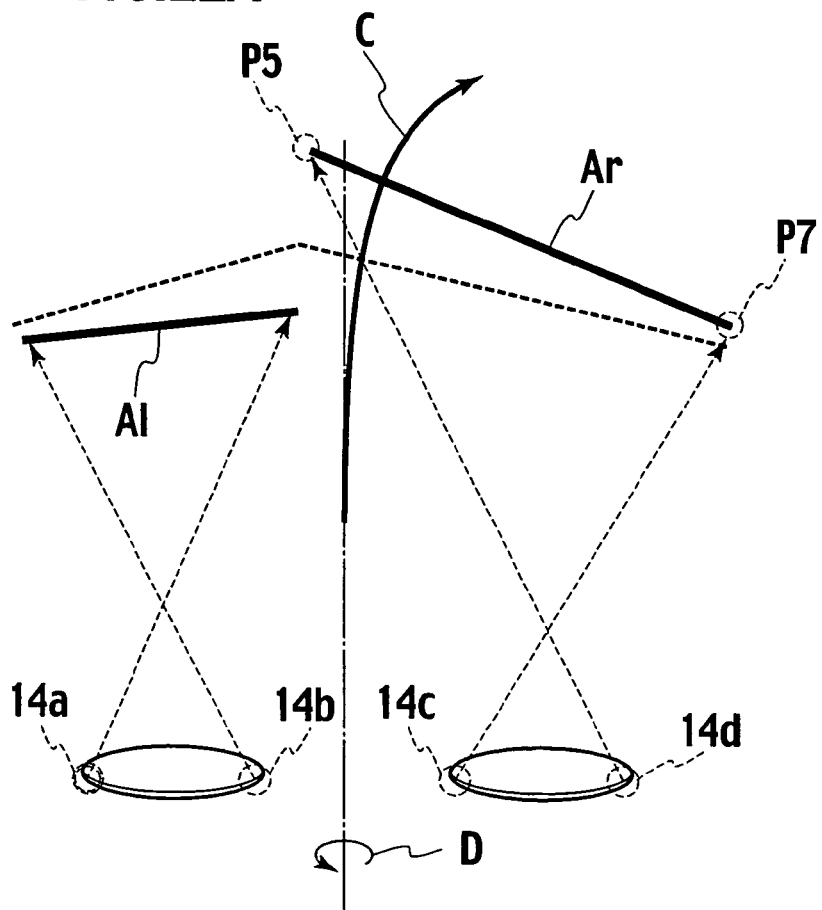
FIGS. 22A and 22B are explanatory views showing an illumination property of the headlights shown in FIGS. 20A and 20B when the vehicle makes a right turn.
Figure 22B:
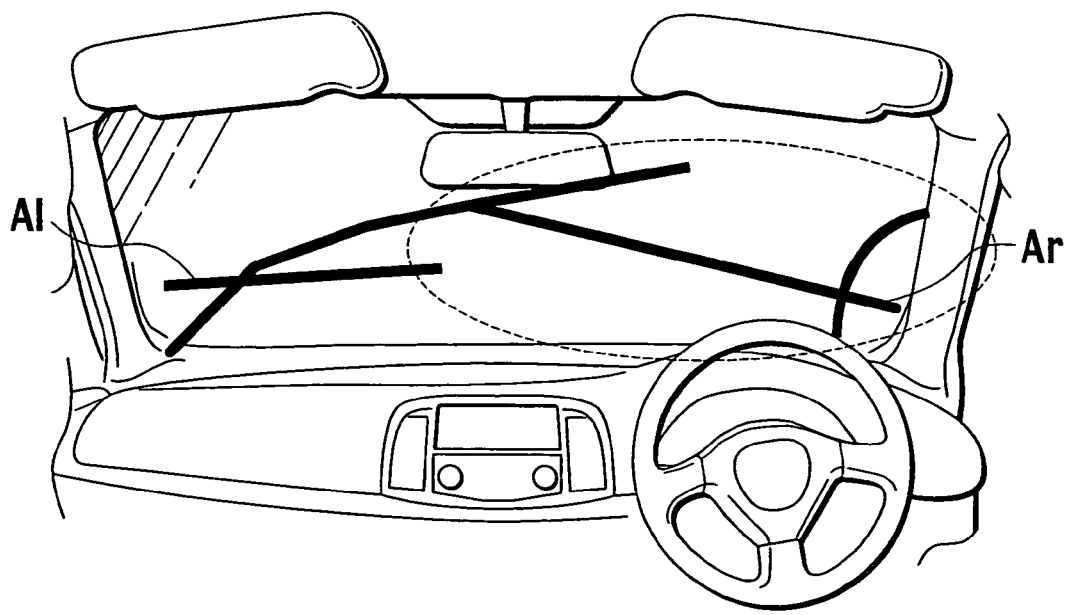

For the case of illuminating in this manner, when a vehicle rolls, an angle of the ridgeline on the inner side of turning becomes large with an increasing roll angle, so that a sense of balance of a driver can be stably maintained. Specifically, when a vehicle in a normal running state shown in FIG. 20 makes a right turn toward a direction of an arrow C shown in FIG. 22A, the vehicle rolls in a direction of an arrow D shown in FIG. 22A, and the left side of the vehicle as viewed from a driver is moved downward from an initial position due to the roll of the vehicle. When focusing on left and right end points 14c and 14d on the reflecting mirror 14 of the headlight 4r, the right end point 14d is moved relative to the road surface, upward by a larger distance as compared to the left end point 14c near the center of the vehicle. Therefore, when the vehicle makes a right turn, this upward movement of the right end point 14d on the reflecting mirror causes the left end point P5 on the right ridgeline Ar of the virtual line segment A to move in a vehicle forward direction by a great distance, and causes the right end point P7 on the right ridgeline Ar to move by a small distance. When this circumstance is seen from a driver's seat, an angle of the ridgeline on the inner side of turning (right ridgeline in this case) becomes large relative to the horizontal, as shown in FIG. 22B.

As described above, according to the fourth example, since the light distribution of the headlights is set so that beams of light which provide an illumination pattern on a road surface may cross each other between the headlights and the road surface, an inclination angle of the ridgeline on the inner side of turning becomes large as a roll angle of the vehicle increases, thereby maintaining the effect of stabilizing a sense of balance of a driver even in a region where the vehicle is subjected to large turning lateral acceleration. The description herein is only given of when a vehicle makes a right turn, but the same will apply to a left turn of the vehicle.

EXAMPLE 5

Figure 23A:
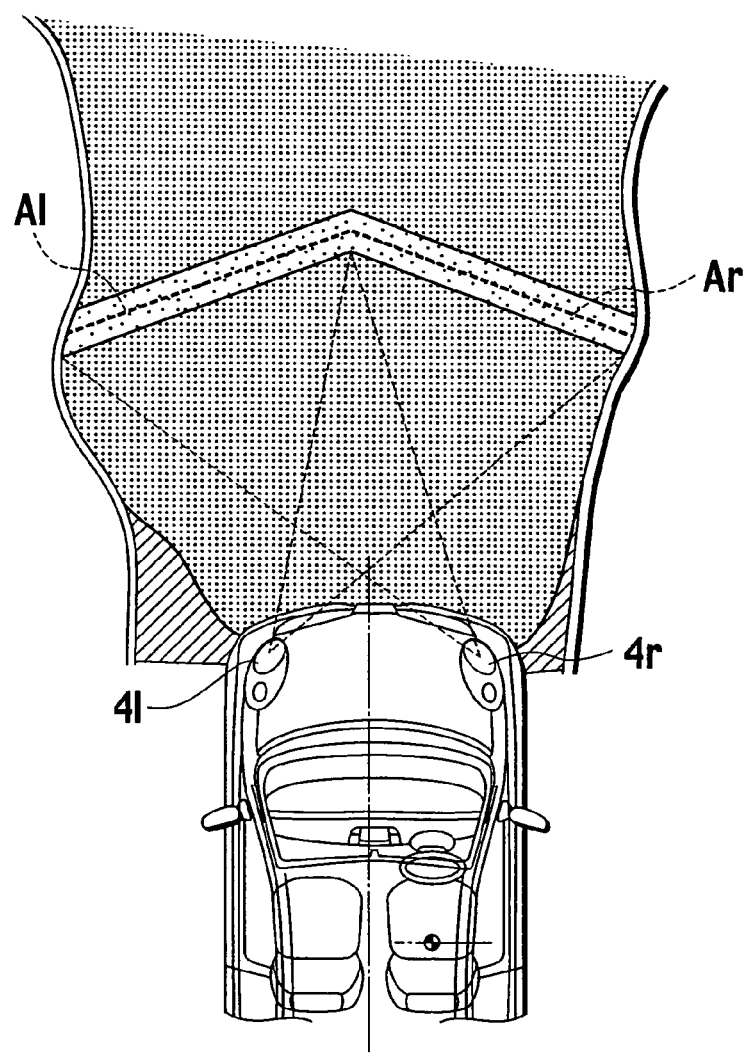
FIGS. 23A and 23B show another illumination property of the headlights in the embodiment of the present invention.
Figure 23B:
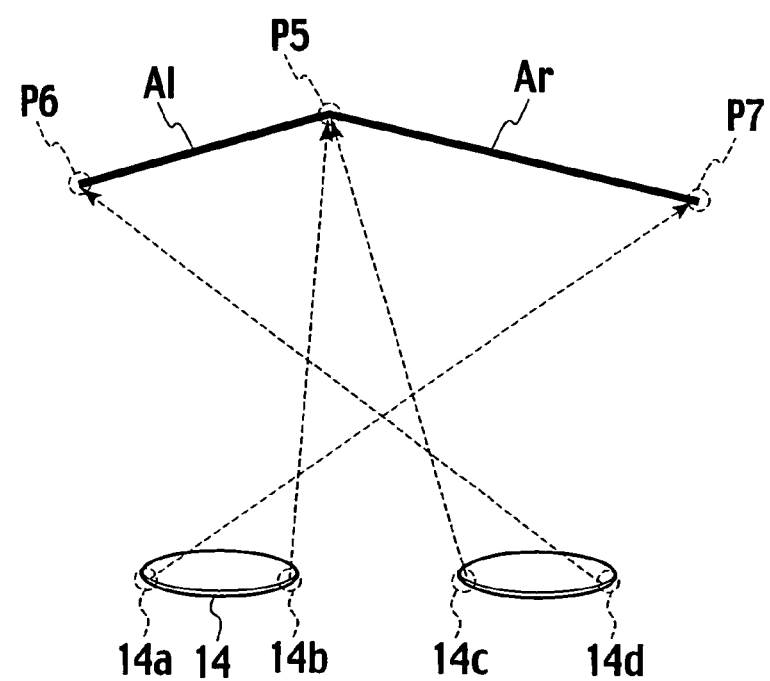
Figure 24A:
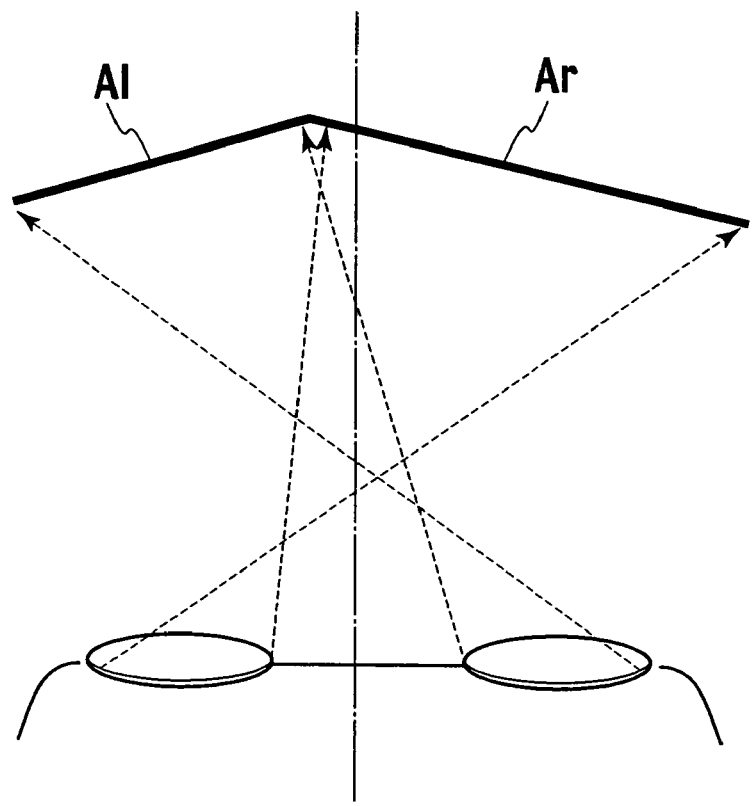
FIGS. 24A and 24B are explanatory views showing an illumination property of the headlights shown in FIGS. 23A and 23B while a vehicle is running in a normal state.
Figure 24B:
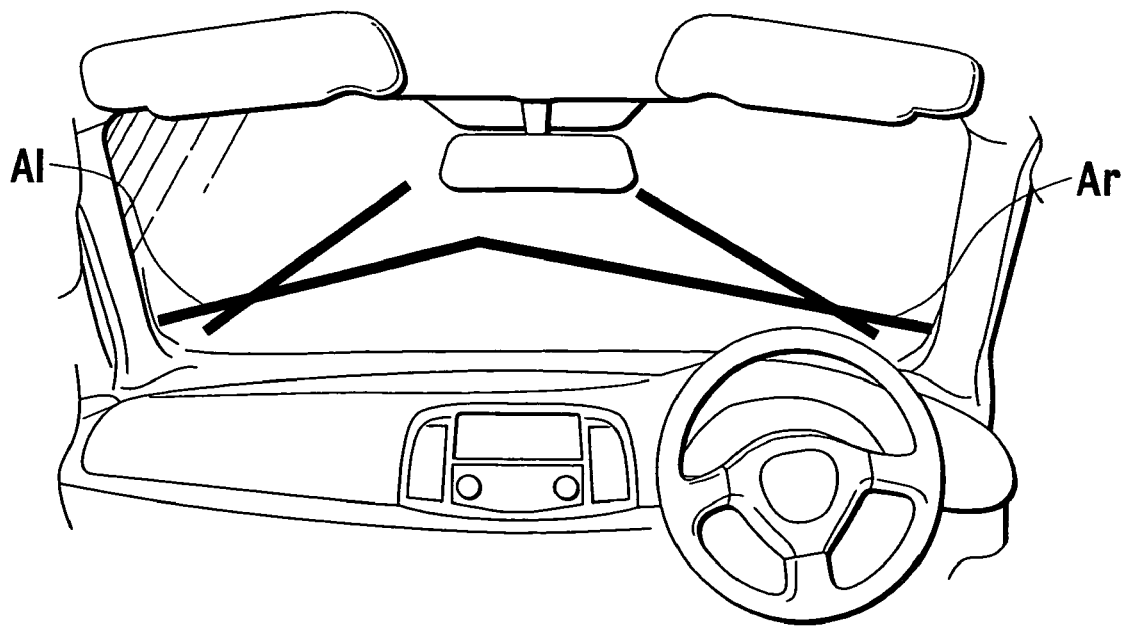
Figure 25A:
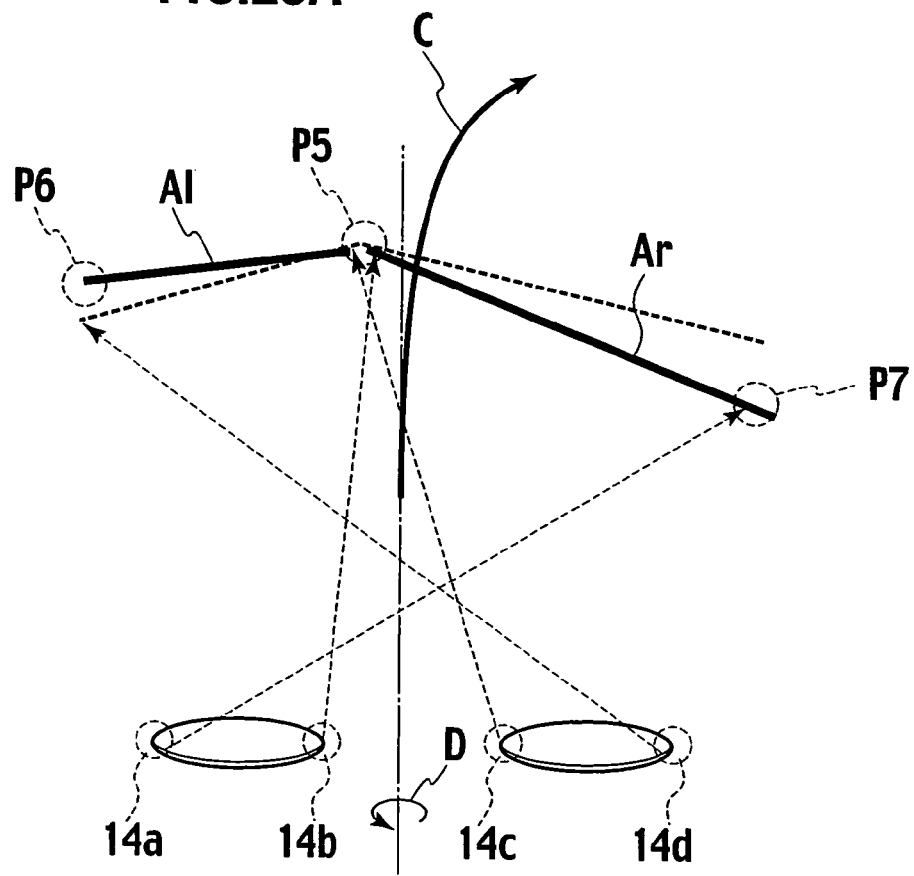
FIGS. 25A and 25B are explanatory views showing an illumination property of the headlights shown in FIGS. 23A and 23B when the vehicle makes a right turn.
Figure 25B:
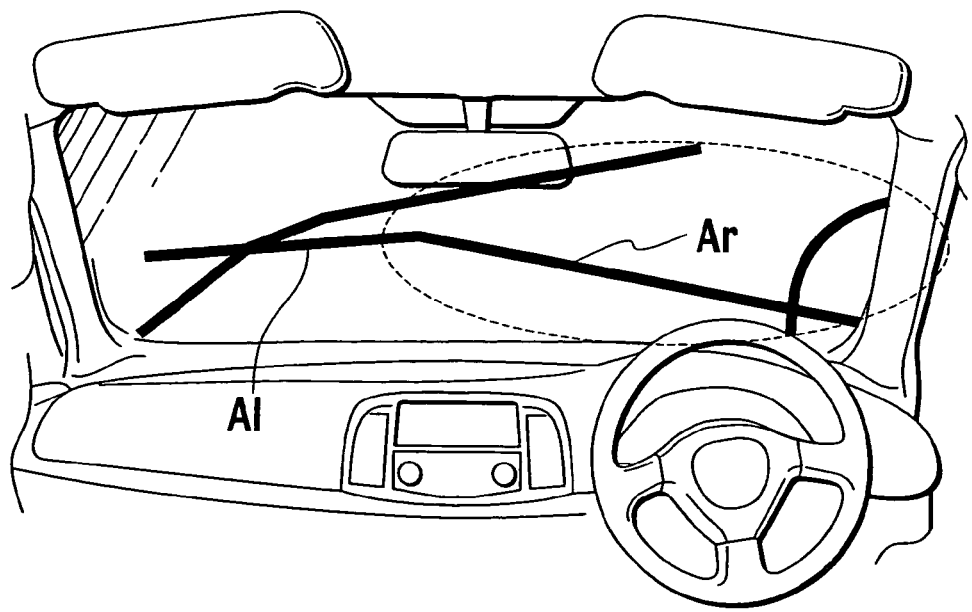

In the fourth example, the left ridgeline Al and right ridgeline Ar on the virtual line segment A are illuminated by the left and right headlights 4l and 4r, respectively, of the vehicle. It is, however, also allowable to illuminate the left ridgeline Al and right ridgeline Ar on the virtual line segment A by the right and left headlights 4r and 4l, respectively, of the vehicle, as shown in FIG. 23. With this configuration, when a vehicle in a normal running state shown in FIG. 23 makes a right turn toward a direction of an arrow C shown in FIG. 25A, an area around a point P5 corresponding to the apex of the virtual line segment A is illuminated by beams of light which pass through vehicle's inner side points on the reflecting mirrors of the headlights 4r and 4l, and thus is less susceptible to changes in attitudes of the vehicle caused by the roll thereof, as compared to right and left end points P6 and P7 on the ridgelines. Therefore, the illuminated region does not have a great change to the vehicle. On the other hand, the left and right end points P6 and P7 on the ridgelines are greatly moved in forward and backward directions, respectively, of the vehicle with the roll thereof. As a result, the left and right ridgelines can remain linked together, which leads to reduction in unnecessary changes in forward visibility on the region that is irrelevant to the stabilization of a sense of balance.

As described above, according to this fifth example, the light distribution properties of the left and right headlights are set so that beams of light emitted there from which provide an illumination pattern on a road surface may cross each other between the headlights and the road surface. Therefore, even when a roll angle of the vehicle becomes large, an illumination pattern configuration on the road surface can be continuously maintained, and a sense of balance of a driver can be continuously stabilized even in an area where the vehicle is subjected to large turning lateral acceleration. Note here that the above description is only given of when a vehicle makes a right turn, but the same will apply to a left turn of the vehicle.

EXAMPLE 6

Figure 26:
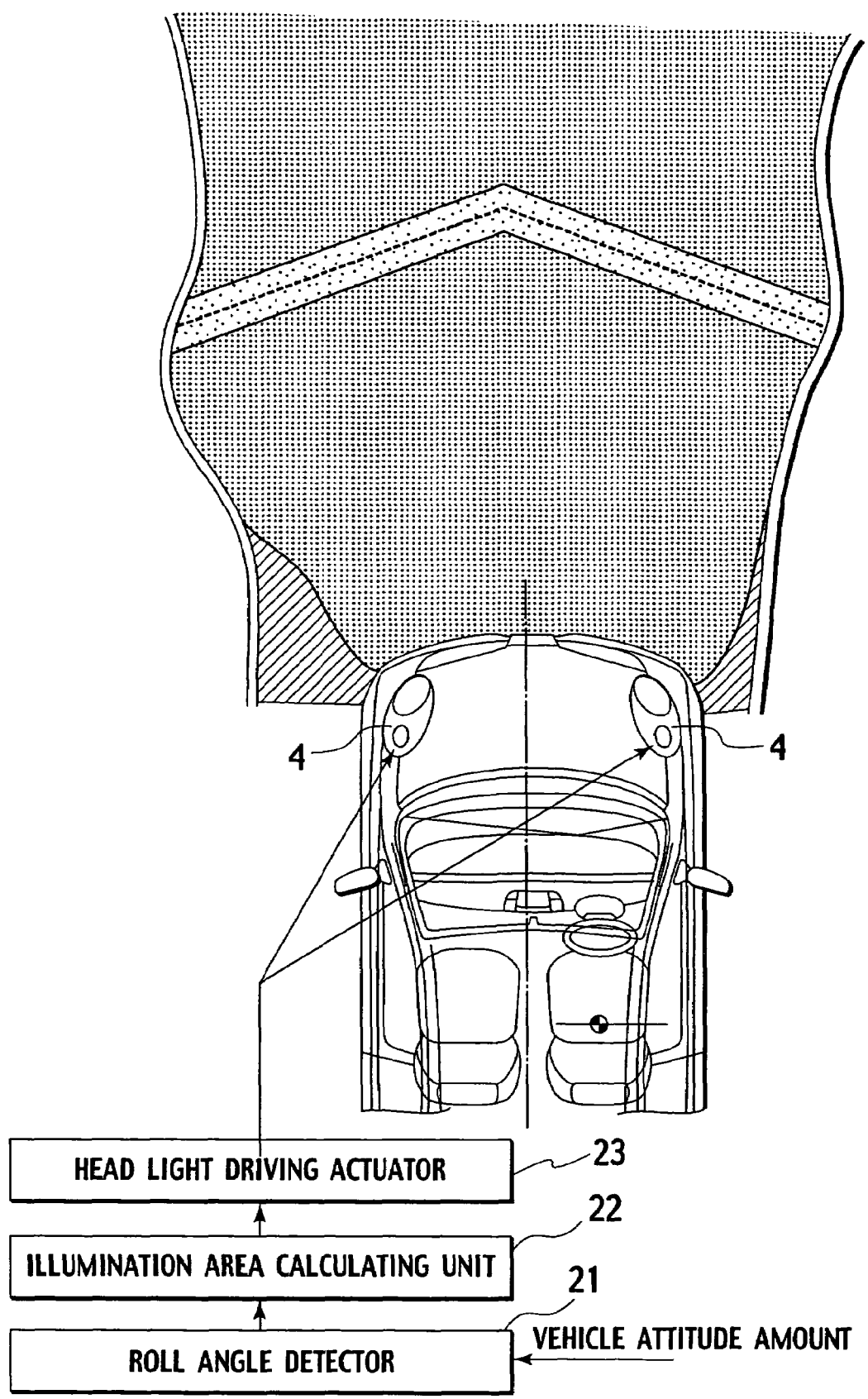
FIG. 26 shows another structure of the visibility adjusting apparatus for vehicle according to the embodiment of the present invention.
Figure 27A:
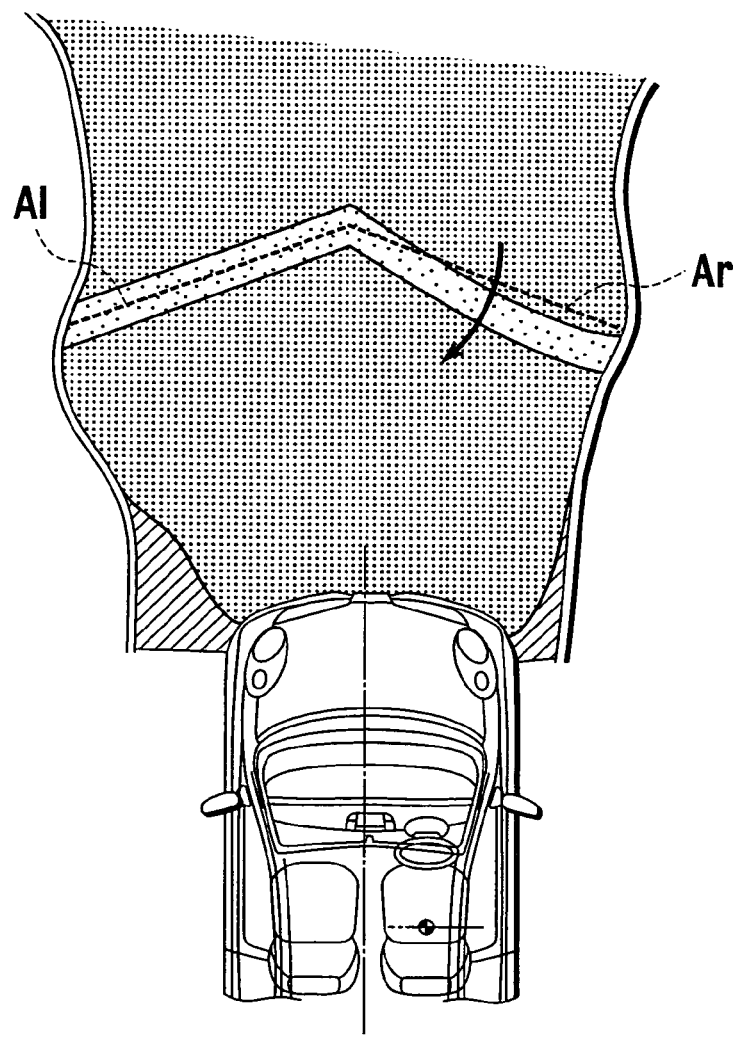
FIGS. 27A and 27B are explanatory views showing technical effects offered by the visibility adjusting apparatus shown in FIG. 26.
Figure 27B:
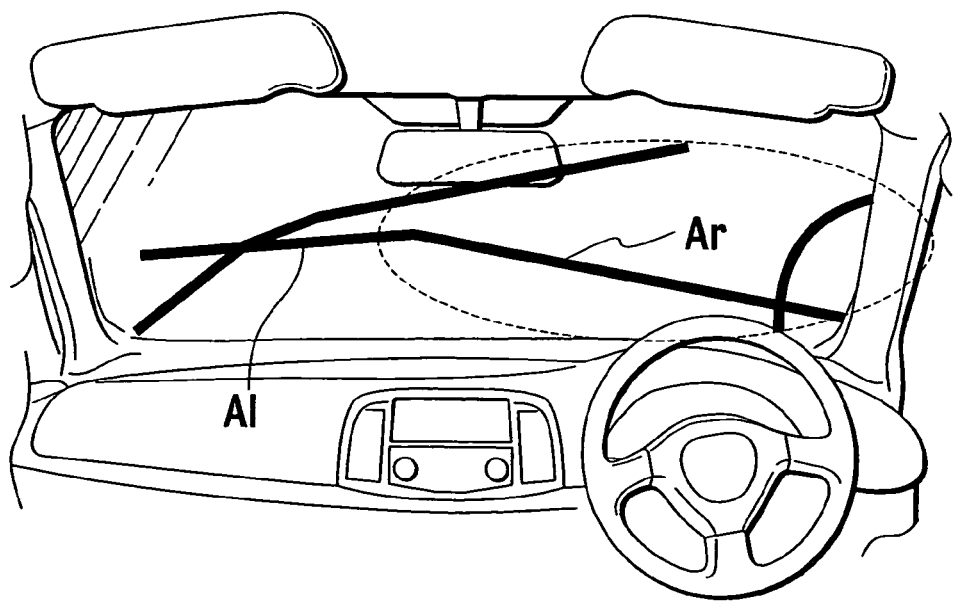

In a sixth example, as shown in FIG. 26, the vehicle is provided with a roll angle detector 21 for detecting a roll angle based on vehicle attitudes, an illumination area calculating unit 2 for calculating required angle variations of the ridgeline in an illuminated region in accordance with the detected roll angle, and a headlight driving actuator 23 for controlling an orientation of the headlights in accordance with the calculated value of the angle variations. For example, in the case of a right turn, a right end point of the belt-like region is moved to the vehicle side in forward and backward directions of the vehicle, in order to vary the angle of the right-side ridgeline based on the roll angle of the vehicle. With this configuration, the right-side ridgeline which is on the inner side of turning as viewed from a driver's seat moves to a direction in which the angle of the right-side ridgeline becomes large relative to the horizontal, so that a sense of balance of a driver can be stabilized in any turning situations. In regard to the calculation of the illumination area configuration, it is desirable to set the inclination of the ridgelines so that they seem to be horizontal as viewed from a driver's seat at the time of rolling, and in practice, it is preferable to set the inclination of the ridgelines by referring to a map which represents correspondence between roll angles and illumination area configurations. Moreover, as a method of driving headlights, it is appropriate to employ a method disclosed in Japanese Patent Application Laid-Open No. 6-144108.

As descried above, according the sixth example, the illuminating directions of the headlights are adjusted in accordance with changes in vehicle attitudes which occur during turning, braking, or acceleration, so that a pattern configuration provided by illumination of the headlights can be optimally maintained in any running situations, and a sense of balance of a driver can always be maintained.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

The entire content of a Patent Application No. TOKUGAN 2004-020375 with a filing date of Jan. 28, 2004, is hereby incorporated by reference.

What is claimed is:

1. A method of adjusting visibility for vehicle by which forward visibility of a driver is adjusted, comprising the processes of:

disposing a virtual parting line at a lower end of a windshield, the parting line having an apex and left and right ridgelines, the apex being located between a position opposed to a driver and a vehicle center position and being deviated from the opposed position, the left and right ridgelines uniformly inclining downward from the apex toward opposite sides in a vehicle-width direction; and controlling an illumination property of headlights of the vehicle so that light quantity or color temperature in a belt-like region on a road surface is different from those in other illuminated regions, the belt-like region including a virtual line segment on the road surface that is composed of a set of points at which a line connecting a driver's viewpoint with a point on the parting line intersects with the road surface in front of the vehicle.

2. The method of adjusting visibility for vehicle according to claim 1, further comprising the process of:
controlling the illumination property of the headlights so that all or part of light emitted from the headlights is concentrated onto the belt-like region.

3. The method of adjusting visibility for vehicle according to claim 1, further comprising the process of:
controlling the illumination property of the headlights so that all or part of light emitted from the headlights is concentrated onto two or more illuminated regions lying in front of and behind the belt-like region.

4. The method of adjusting visibility for vehicle according to claim 1, further comprising the process of:
controlling an illumination property of at least one of three or more headlights so that all or part of light emitted from the headlights is concentrated onto the belt-like region.

5. The method of adjusting visibility for vehicle according to claim 1, further comprising the process of:
controlling an illumination property of at least one of three or more headlights so that all or part of light emitted from the headlights is concentrated onto two or more illuminated regions lying in front of and behind the belt-like region.

6. The method of adjusting visibility for vehicle according to claim 1, further comprising the process of:
making color temperature of illumination light from the headlight whose illumination property is controlled, different from color temperature of illumination light from other headlights.

7. The method of adjusting visibility for vehicle according to claim 1, wherein the entire or part of area on a reflecting minor which composes the headlight for illuminating the belt-like region has a continuously curved surface or a polyhedral surface formed as the continuously curved surface by combining a plurality of similar plates together, which the curved surface is orthogonal to a straight line that equally divides an angle formed between a line segment connecting a point on the virtual line segment with an arbitrary point within the curved surface and a line segment connecting the arbitrary point with a position of a light source.

8. The method of adjusting visibility for vehicle according to claim 1, wherein a first area in a reflecting minor which composes the headlight for illuminating the belt-like region has a continuously curved surface or a polyhedral surface formed as the continuously curved surface by combining a plurality of similar plates together, which the curved surface is orthogonal to a straight line that equally divides an angle formed between a first line segment connecting an arbitrary point within the curved surface with a point on a line segment which is similar to the virtual line segment and is deviated therefrom on the far side of the vehicle and a second line segment connecting the arbitrary point with a position of a light source, and
a second area in the reflecting minor which composes the headlight for illuminating the belt-like region has a continuously curved surface or a polyhedral surface formed as the continuously curved surface by combining a plurality of similar plates together, which the curved surface is orthogonal to a straight line which equally devices an angle formed between a third line segment connecting an arbitrary point within the curved surface with a point on a line segment which is similar to the virtual line segment and is deviated therefrom on the near side of the vehicle and a fourth line segment connecting the arbitrary point with the position of the light source.

9. The method of adjusting visibility for vehicle according to claim 1, further comprising the process of:
illuminating left side and right side of the belt-like region by lights passing through a right portion and a left portion, respectively, of a lens or a reflecting mirror which composes the headlight, as viewed from the inside of the vehicle, when the light quantity or color temperature in the belt-like region is made different by use of at least one of the headlights.

10. The method of adjusting visibility for vehicle according to claim 1, further comprising the process of:
illuminating left side and right side of the belt-like region by headlights on the right side and the left side, respectively, of the vehicle, as viewed from the inside of the vehicle, when the light quantity or color temperature in the belt-like region is made different by use of at least two of the headlights.

11. The method of adjusting visibility for vehicle according to claim 1, further comprising the process of:
varying a position and angle of at least one of the entire or part of a reflecting mirror which composes the headlight, a light source, and the entire headlight, in accordance with changes in at least one of a roll angle, a pitch angle, and upward and downward displacement, of the vehicle.

12. A visibility adjusting apparatus for vehicle for adjusting forward visibility of a driver, comprising:
a control unit that disposes a virtual parting line at a lower end of a windshield, and controls an illumination property of headlights of a vehicle so that light quantity or color temperature in a belt-like region on a road surface is different from those in other illuminated regions, wherein
the parting line has an apex and left and right ridgelines, the apex being located between a position opposed to the driver and a vehicle center position and being deviated from the opposed position, the left and right ridgelines uniformly inclining downward from the apex toward opposite sides in a vehicle-width direction, and the belt-like region includes a virtual line segment on the road surface that is composed of a set of points at which a line connecting a driver's viewpoint with a point on the parting line intersects with the road surface in front of the vehicle.

13. The visibility adjusting apparatus for vehicle according to claim 12, wherein the control unit controls the illumination property of the headlights so that all or part of light emitted from the headlights is concentrated onto the belt-like region.

14. The visibility adjusting apparatus for vehicle according to claim 12, wherein the control unit controls the illumination property of the headlights so that all or part of light emitted from the headlights is concentrated onto two or more illuminated regions lying in front of and behind the belt-like region.

15. The visibility adjusting apparatus for vehicle according to claim 12, wherein the control unit controls an illumination property of at least one of three or more headlights so that all or part of light emitted from the headlights is concentrated onto the belt-like region.

16. The visibility adjusting apparatus for vehicle according to claim 12, wherein the control unit controls an illumination property of at least one of three or more headlights so that all or part of light emitted from the headlights is concentrated onto two or more illuminated regions lying in front of and behind the belt-like region.

17. A visibility adjusting apparatus for vehicle for adjusting forward visibility of a driver, comprising:
control means for disposing a virtual parting line at a lower end of a windshield, and controlling an illumination property of headlights of a vehicle so that light quantity or color temperature in a belt-like region on a road surface is different from those in other illuminated regions, wherein
the parting line has an apex and left and right ridgelines, the apex being located between a position opposed to the driver and a vehicle center position and being deviated from the opposed position, the left and right ridgelines uniformly inclining downward from the apex toward opposite sides in a vehicle-width direction, and
the belt-like region includes a virtual line segment on the road surface that is composed of a set of points at which a line connecting a driver's viewpoint with a point on the parting line intersects with the road surface in front of the vehicle.

* * * * *